United States Patent [19]

Holt et al.

[11] Patent Number: 5,070,597
[45] Date of Patent: * Dec. 10, 1991

[54] TUBULAR ARTICLE

[75] Inventors: Neil L. Holt, Foster City; Peter L. Larsson, Los Altos; Manoochehr Mohebban, Belmont; Stephen E. Sheehan, Newark; Jeffrey A. Bennett, Mountain View, all of Calif.

[73] Assignee: Raychem Corporation, Menlo Park, Calif.

[*] Notice: The portion of the term of this patent subsequent to Sep. 26, 2006 has been disclaimed.

[21] Appl. No.: 370,411

[22] Filed: Jun. 20, 1989

Related U.S. Application Data

[63] Continuation of Ser. No. 22,444, Mar. 2, 1987, Pat. No. 4,868,967, which is a continuation-in-part of Ser. No. 835,066, Feb. 28, 1986, abandoned, Ser. No. 835,067, Feb. 28, 1986, abandoned, Ser. No. 835,074, Feb. 28, 1986, abandoned, and Ser. No. 907,200, Sep. 12, 1986, abandoned, which is a continuation-in-part of Ser. No. 757,212, Jul. 19, 1985, abandoned.

[51] Int. Cl.$^5$ .............................. H01B 19/00
[52] U.S. Cl. .................... 29/631; 428/34.9; 428/35.1; 428/35.7; 428/36.8; 138/103; 174/84 R; 285/97
[58] Field of Search ............. 29/631, 605, 870, 869; 428/34.9, 35.1, 35.7, 36.8, 36.9, 36.91, 36.92; 174/84 R; 138/103, 178; 285/97

[56] References Cited

U.S. PATENT DOCUMENTS

| | | |
|---|---|---|
| 2,141,645 | 12/1938 | Fawick . |
| 2,306,160 | 12/1942 | Freyssinet . |
| 2,513,527 | 7/1950 | Sjodin . |
| 2,523,716 | 9/1950 | Parr . |
| 2,803,056 | 8/1957 | Brissey, Jr. et al. . |
| 3,086,242 | 4/1963 | Cook et al. . |
| 3,178,732 | 4/1965 | Stibitz . |
| 3,186,404 | 6/1965 | Gardner . |
| 3,222,076 | 12/1965 | Hollingsworth ............ 285/97 X |
| 3,235,289 | 2/1966 | Jones ............................ 29/605 X |
| 3,274,330 | 9/1966 | Becker et al. .................. 174/84 R |
| 3,297,819 | 1/1967 | Wetmore . |
| 3,433,214 | 3/1969 | Silverman . |
| 3,449,811 | 6/1969 | De Ligt . |
| 3,455,336 | 7/1969 | Ellis . |
| 3,515,798 | 6/1970 | Sievert . |
| 3,631,854 | 1/1972 | Fryer . |
| 3,669,099 | 6/1972 | Silverman . |
| 3,749,093 | 7/1973 | Bloom . |
| 3,824,331 | 7/1974 | Mixon, Jr. . |
| 3,828,116 | 8/1974 | Lonow . |
| 3,878,320 | 4/1975 | Mixon, Jr. et al. ........... 174/84 R X |
| 3,897,088 | 7/1975 | Beinhaur . |
| 3,924,603 | 12/1975 | Chapin . |
| 3,978,531 | 9/1976 | Ilon . |
| 3,992,570 | 11/1976 | Beinhaur . |
| 4,025,717 | 5/1977 | Whittingham . |
| 4,029,895 | 6/1977 | Scarborough . |
| 4,070,746 | 1/1978 | Evans et al. . |
| 4,084,275 | 4/1978 | Ilon . |
| 4,228,792 | 10/1980 | Rhys-Davies . |
| 4,400,048 | 8/1983 | Sacks . |
| 4,506,430 | 3/1985 | Guzay, Jr. . |
| 4,685,189 | 8/1987 | Palmqvist . |
| 4,786,087 | 11/1988 | Thewlis et al. .................. 285/97 |

FOREIGN PATENT DOCUMENTS

| | | |
|---|---|---|
| 900933 | 3/1985 | Belgium . |
| 53445 | 6/1982 | European Pat. Off. . |
| 1264184 | 3/1968 | Fed. Rep. of Germany ........ 285/97 |
| 493422 | 2/1976 | U.S.S.R. . |
| 653664 | 3/1979 | U.S.S.R. . |
| 653664 | 3/1979 | U.S.S.R. . |
| 2057203 | 3/1981 | United Kingdom . |
| 2099638 | 2/1985 | United Kingdom . |

OTHER PUBLICATIONS

29th Intr Wire & Cable Symposium Proceedings, 1980, pp. 151-158, Conf. Proceeding Cherry Hill, N.J., by K. Yokoyama et al.

Primary Examiner—Carl E. Hall
Assistant Examiner—Carl J. Arbes
Attorney, Agent, or Firm—Edith A. Rice; Herbert G. Burkard

[57] ABSTRACT

A double-walled article in the form of a tube having a small volume filling of a friction-reducing liquid or solid between its two walls. The article is able to revolve over a substrate by relative sliding motion between its two walls, to provide environmental or electrical protection.

52 Claims, 15 Drawing Sheets

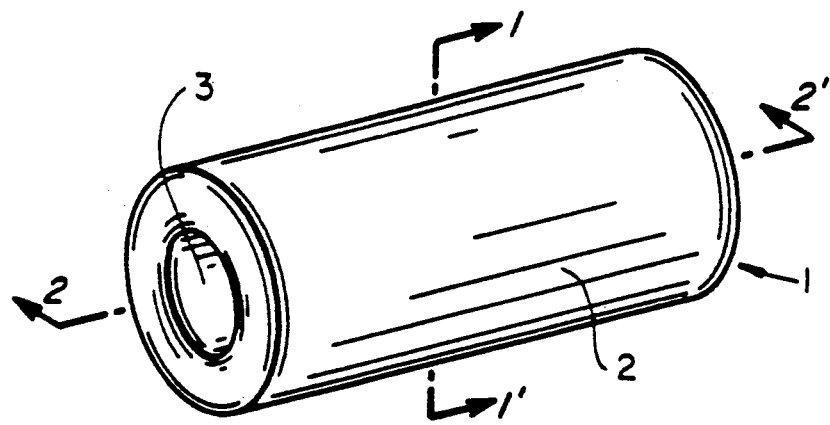
FIG_1A
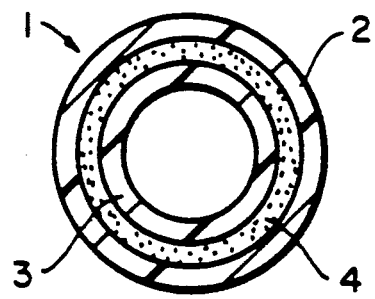
FIG_1B
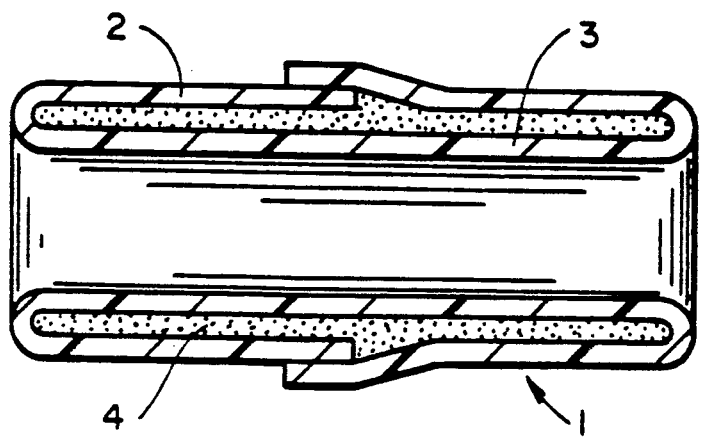
FIG_1C

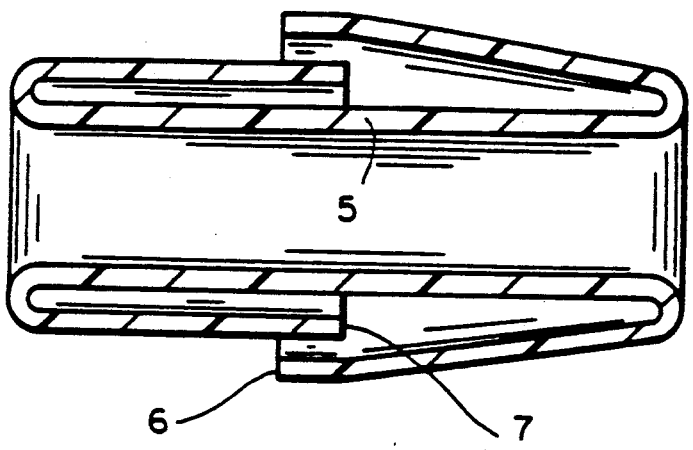
FIG_2
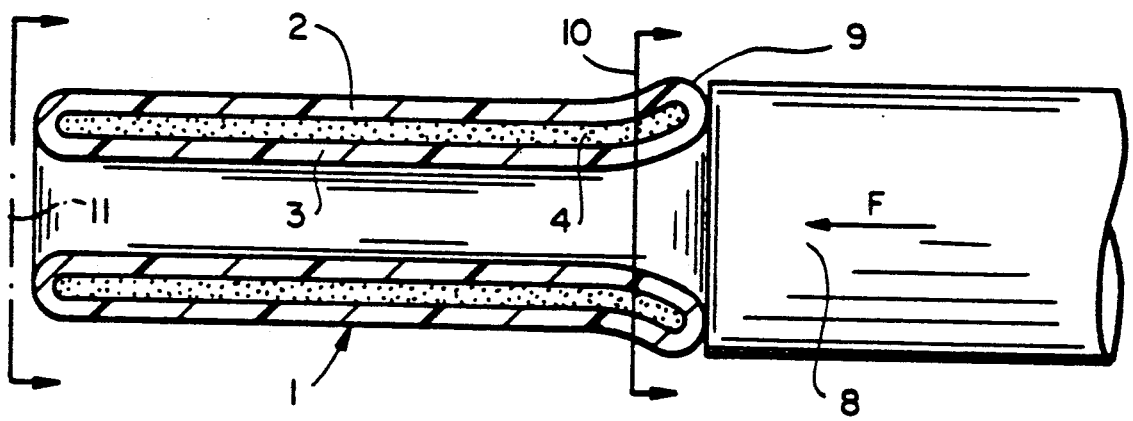
FIG_3A
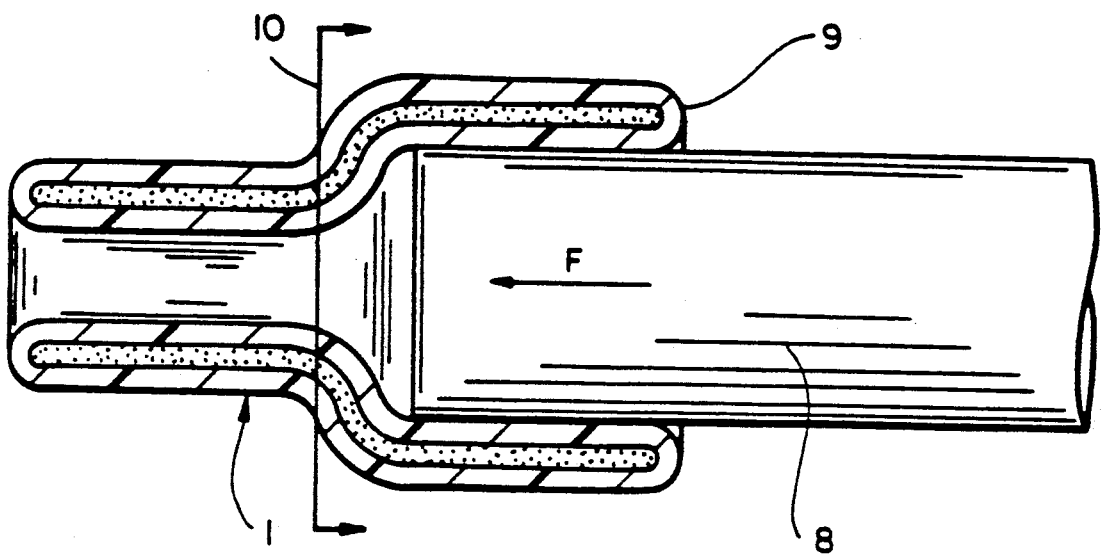
FIG_3B

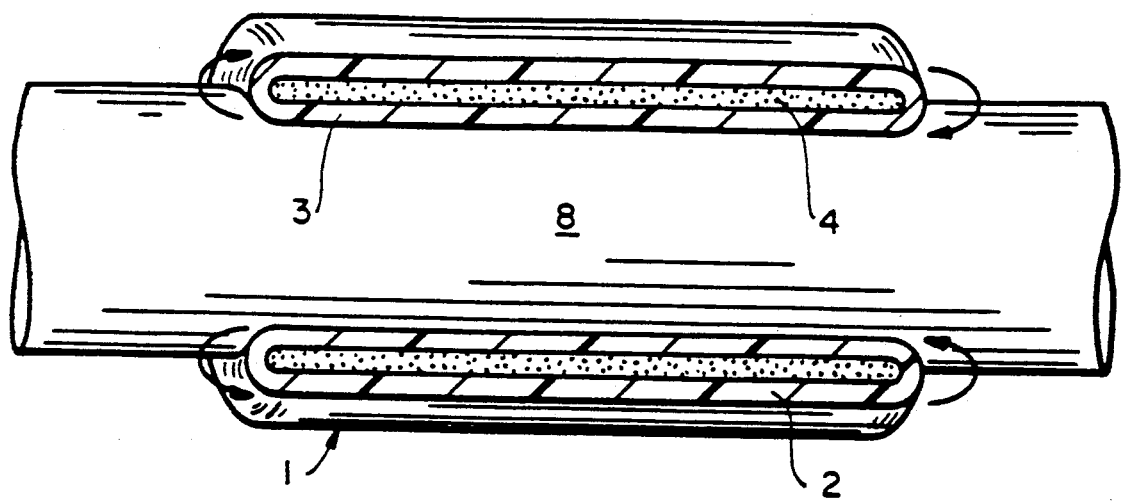
FIG_3C
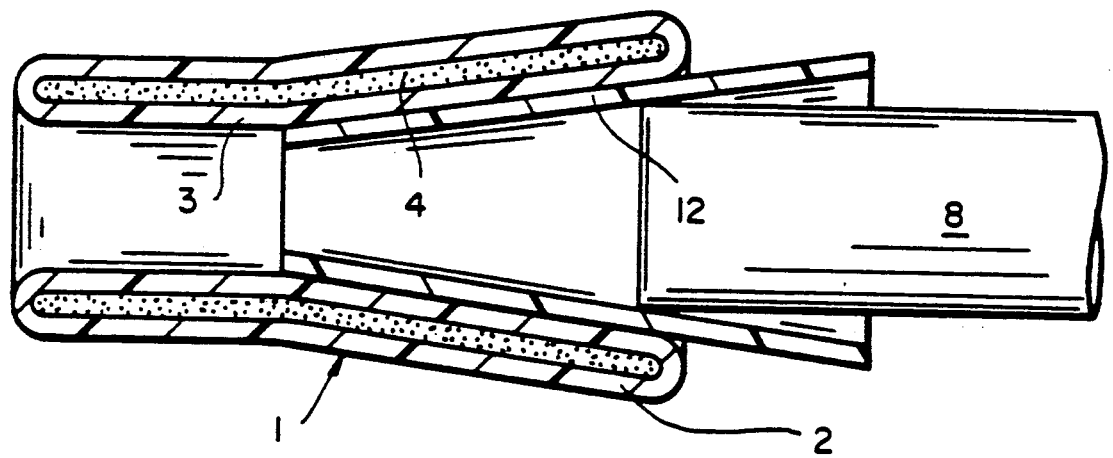
FIG_4
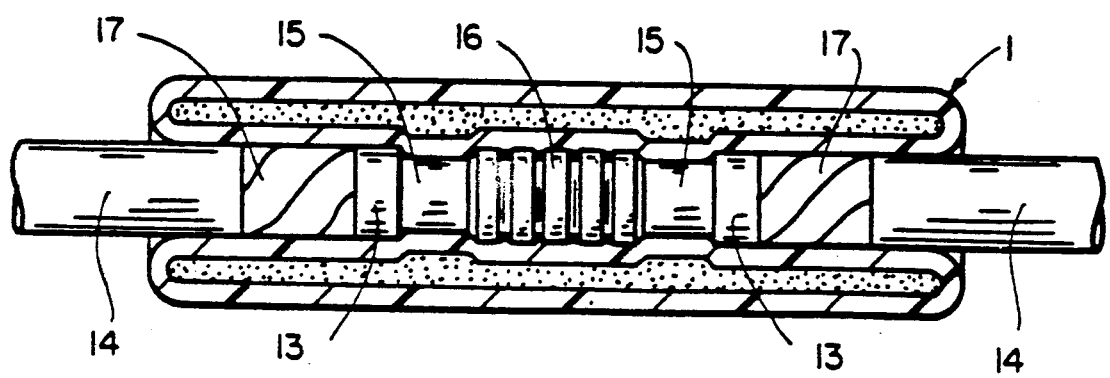
FIG_5

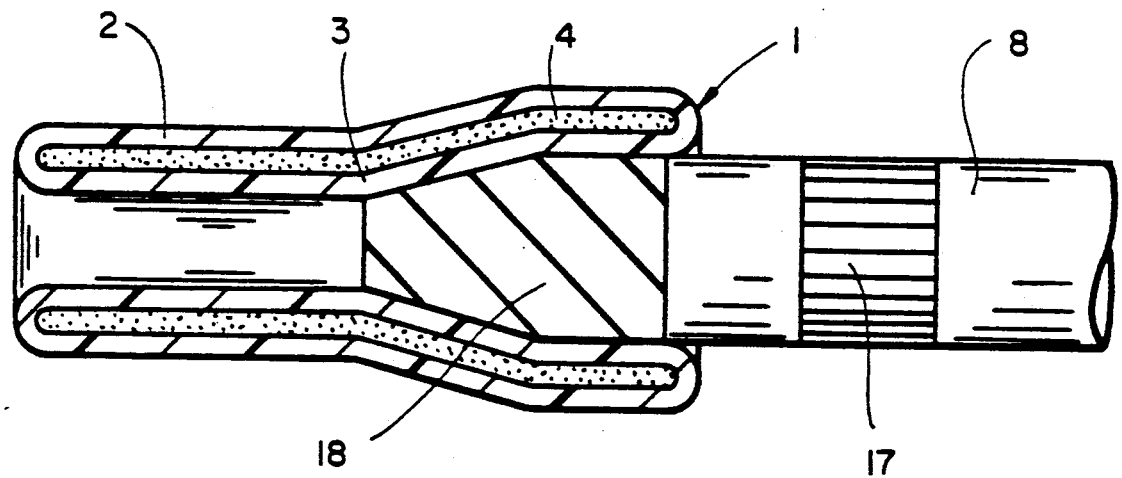
FIG_6A
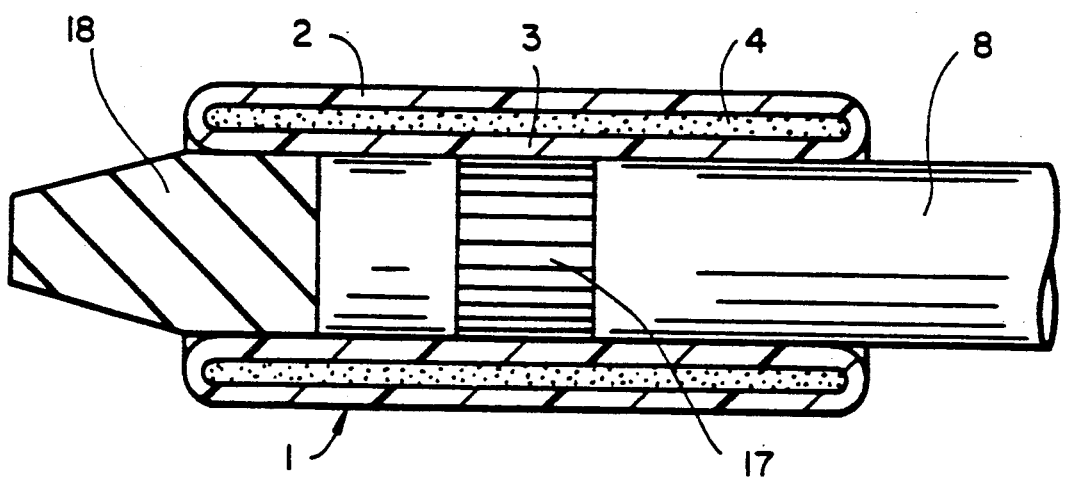
FIG_6B

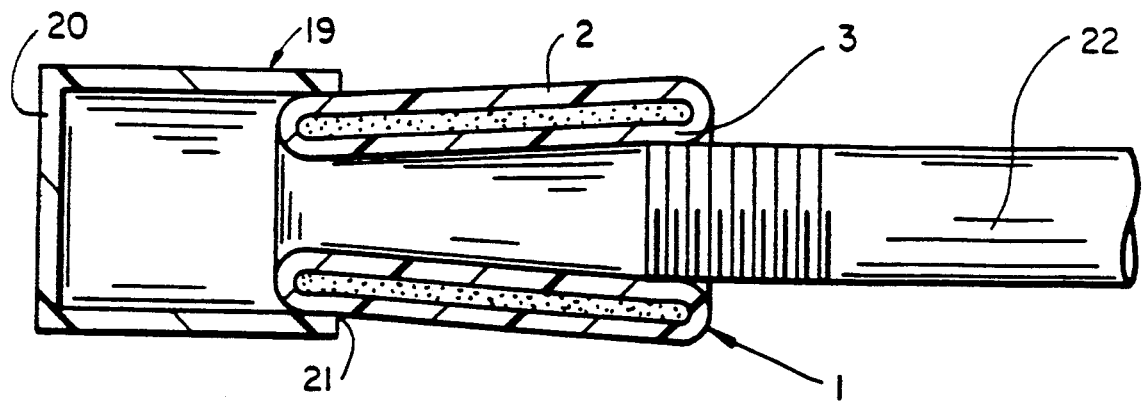
FIG_6C
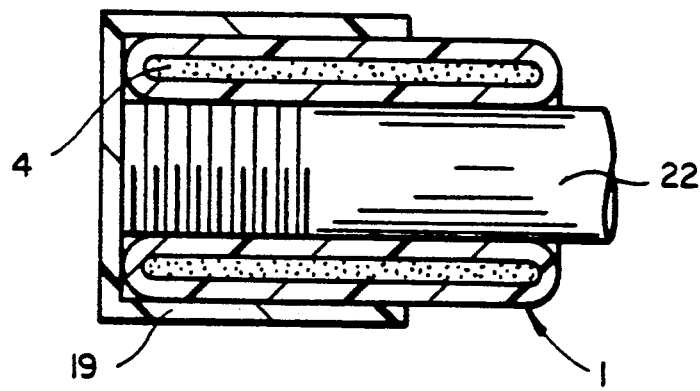
FIG_6D
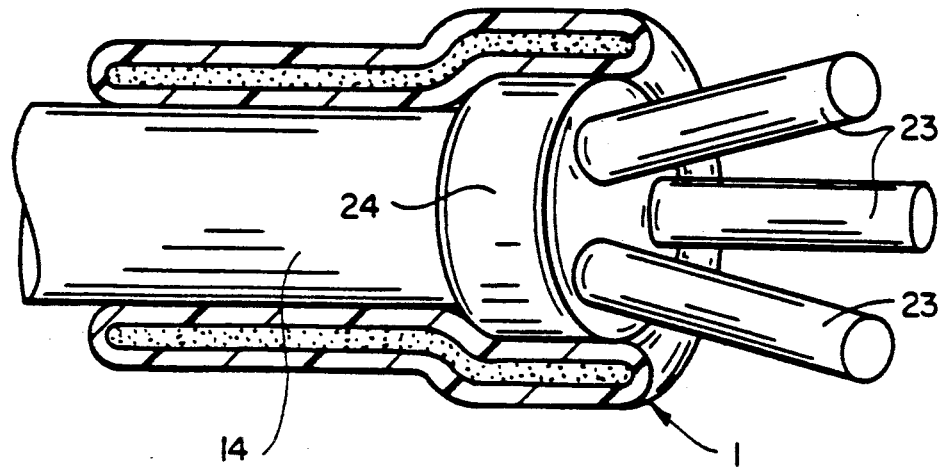
FIG_7

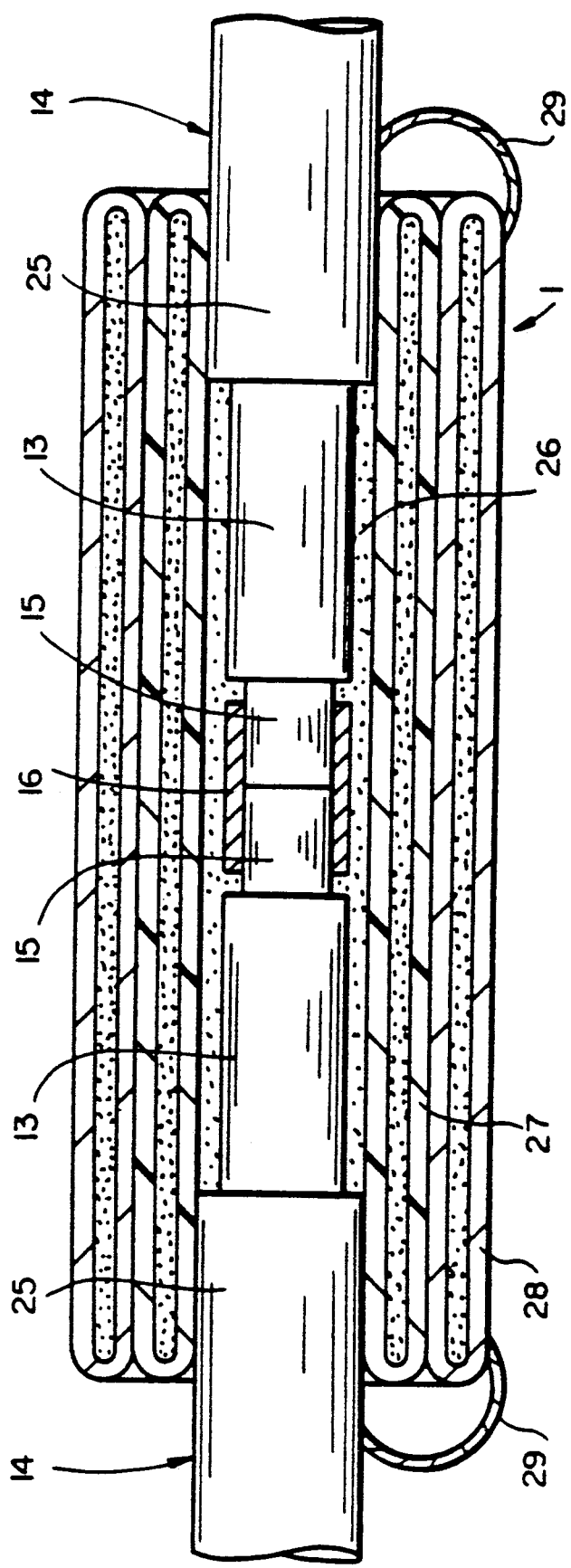
FIG_8

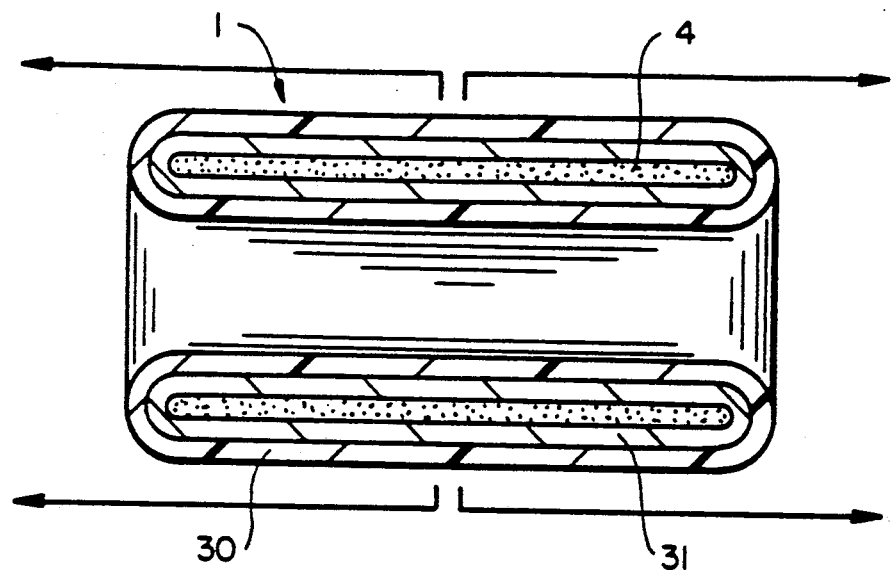
FIG_9A
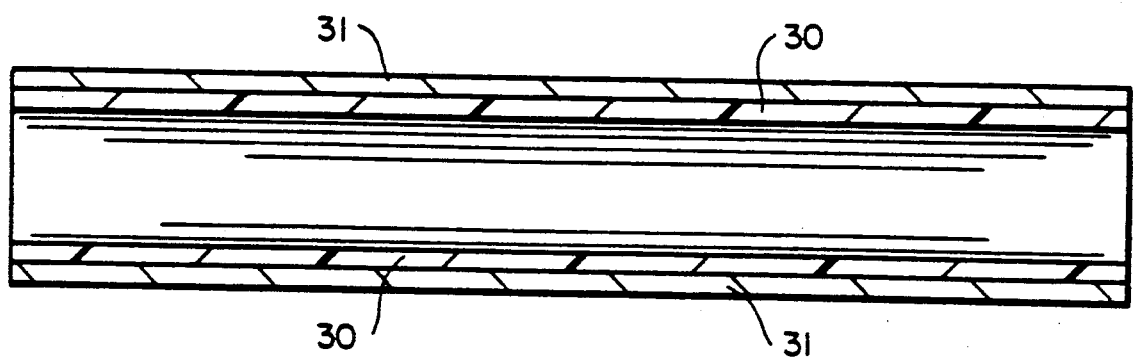
FIG_9B

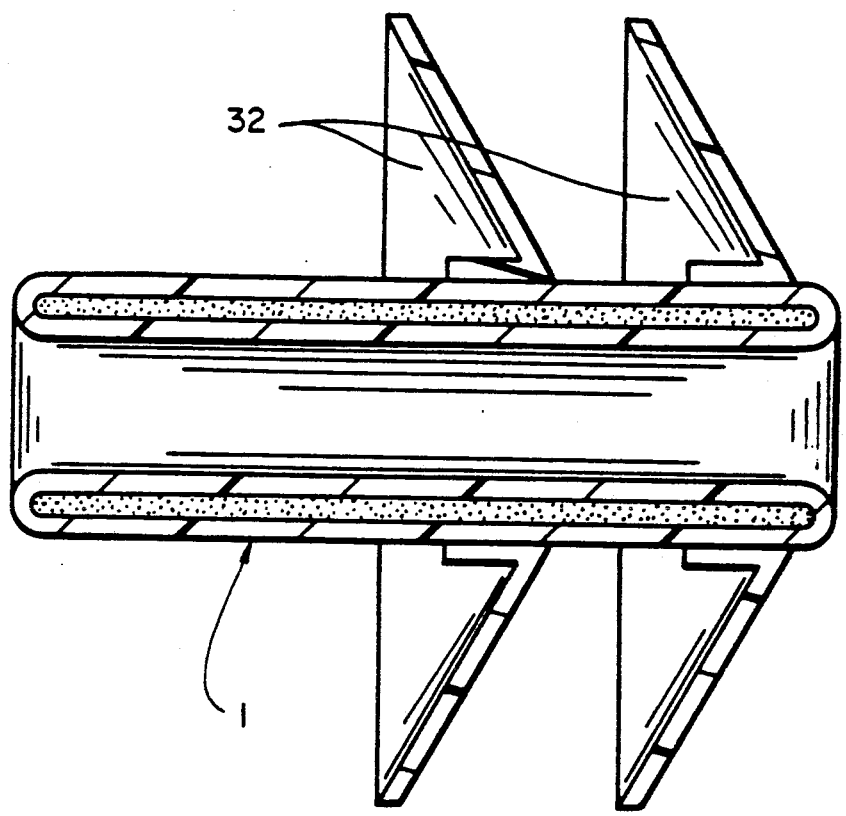
FIG_10
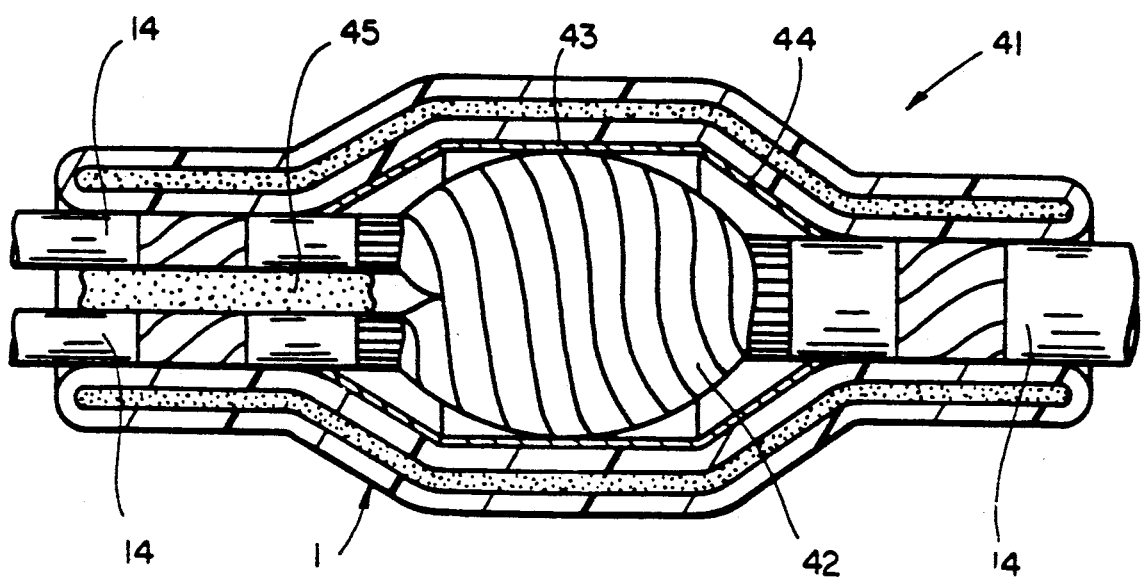
FIG_12

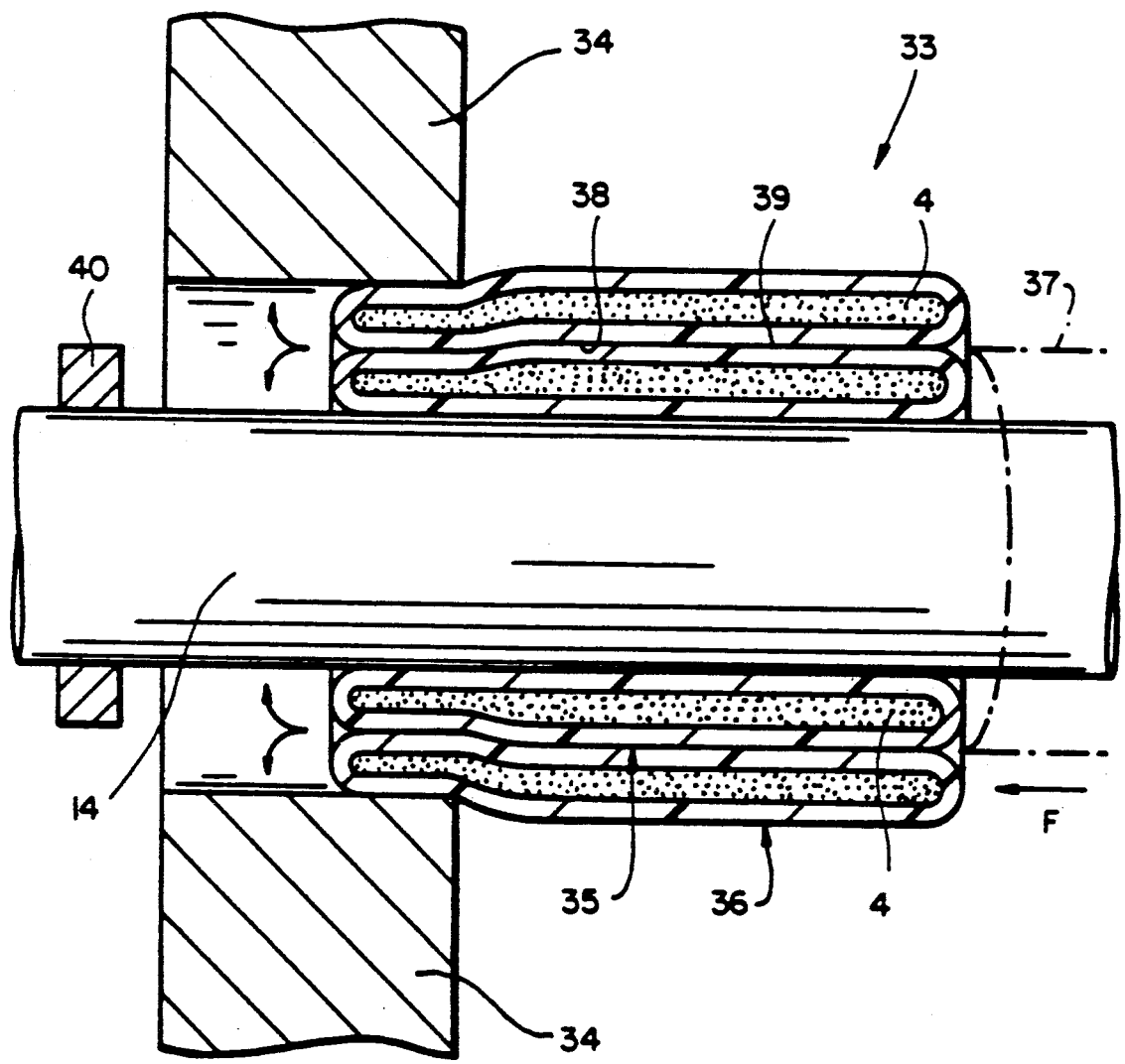
FIG_11

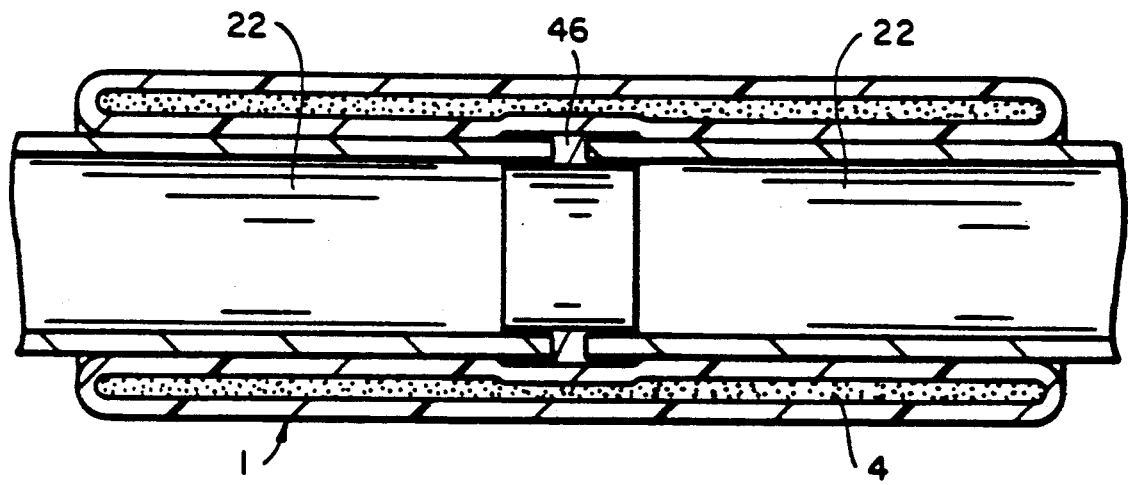
FIG_13
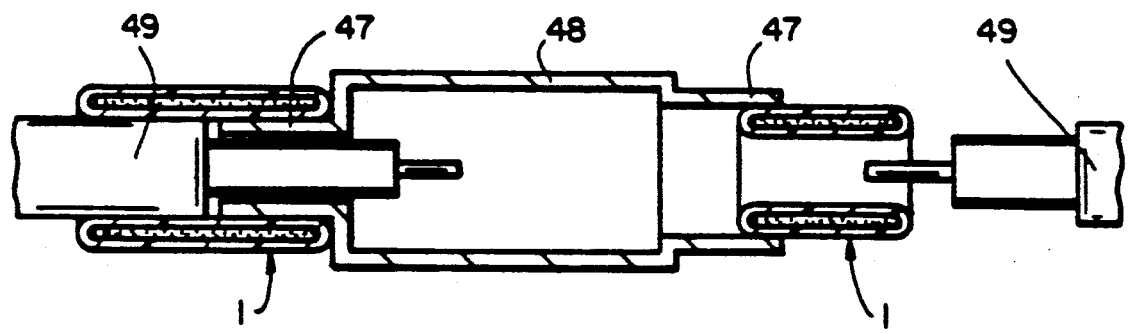
FIG_14

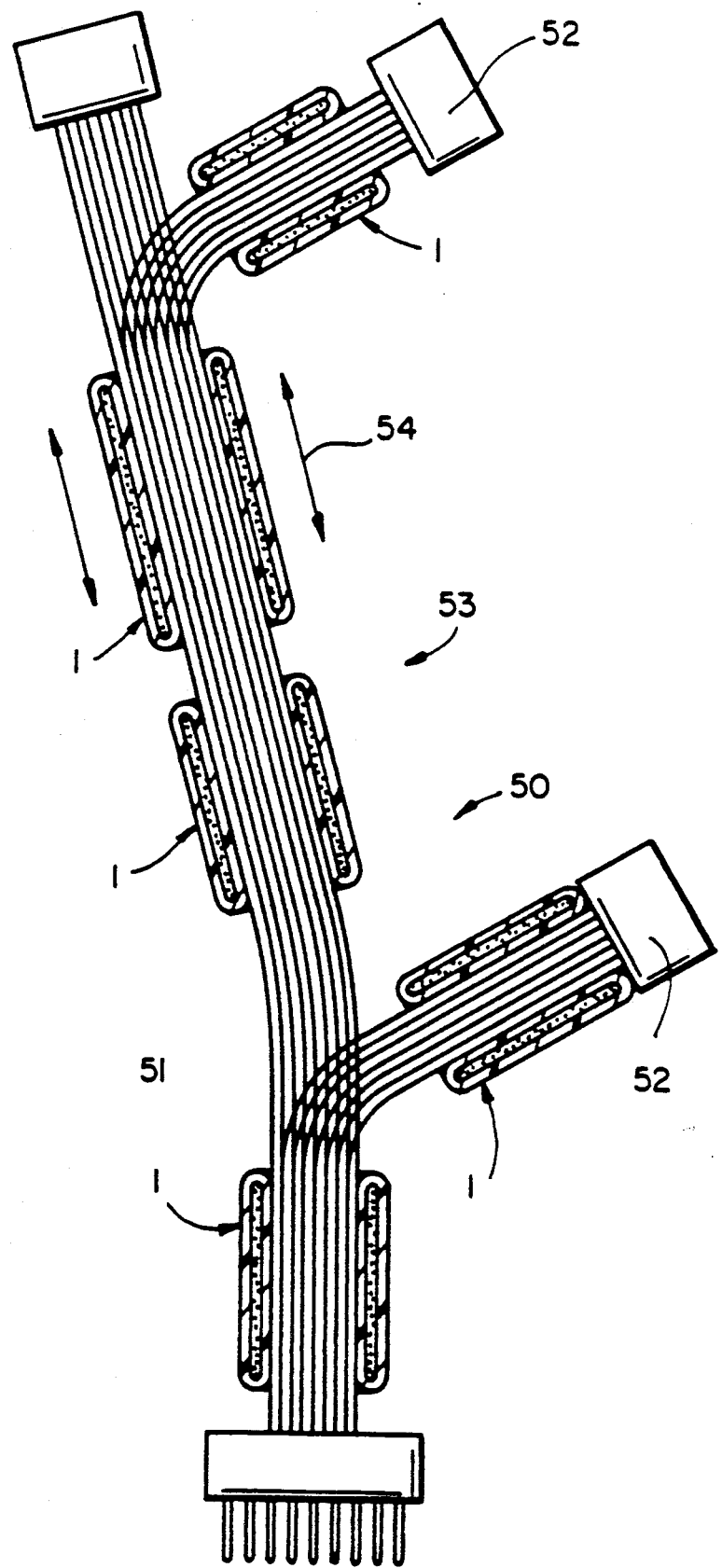
FIG_15

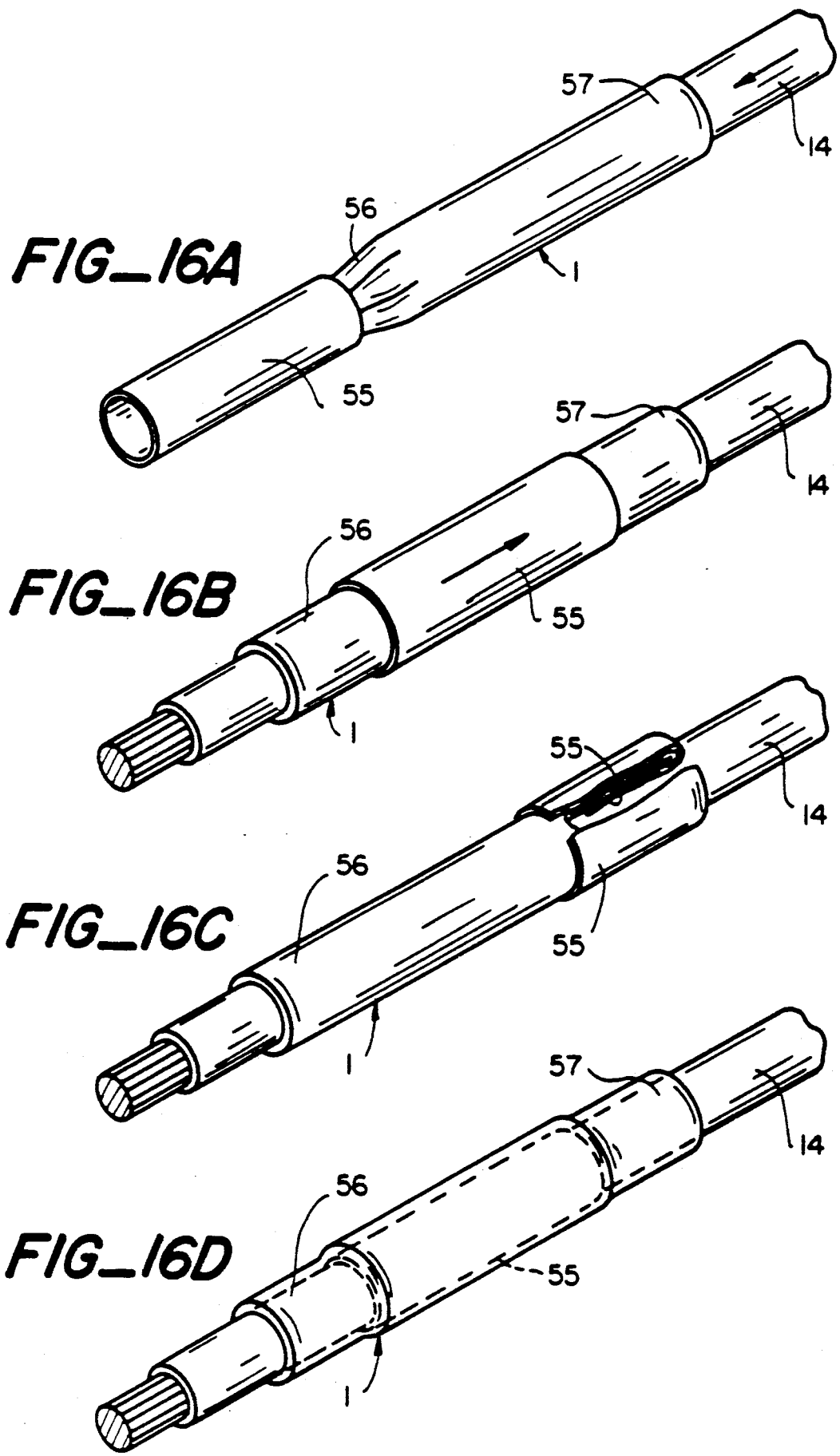

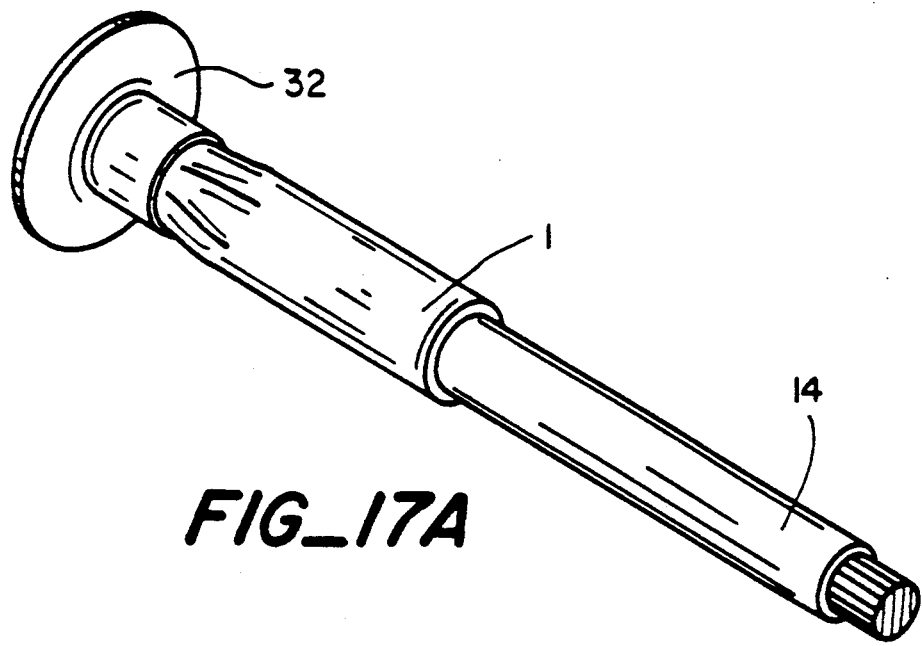
FIG_17A
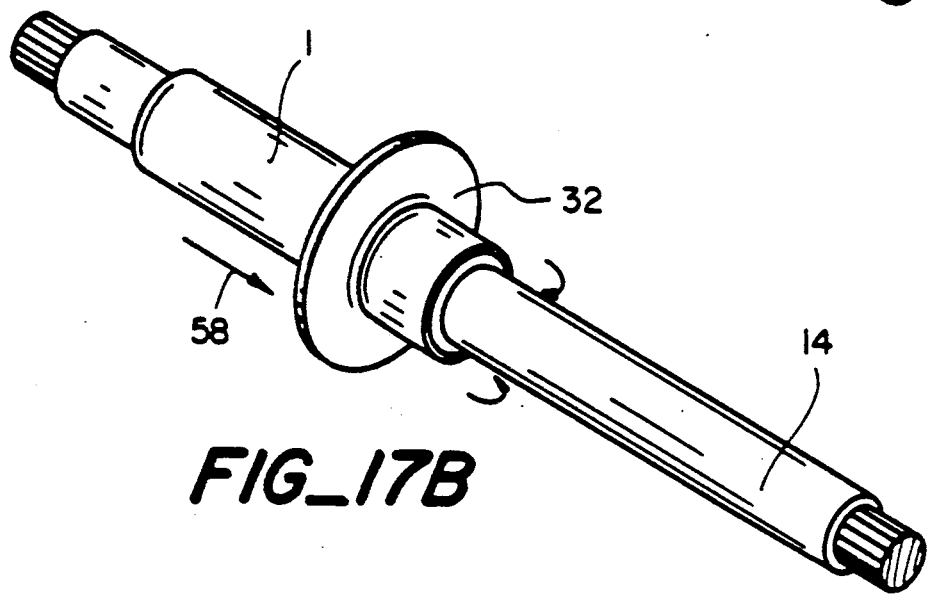
FIG_17B
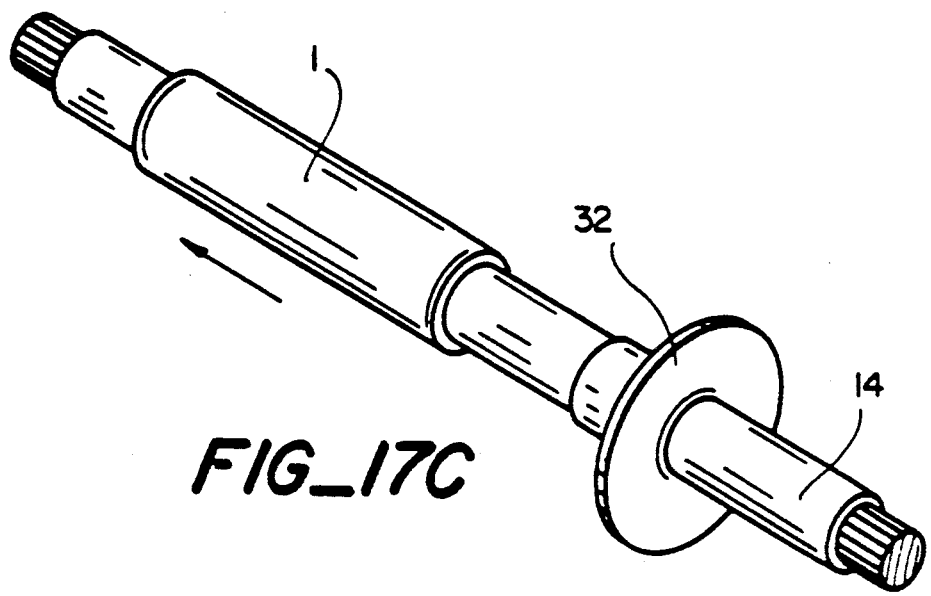
FIG_17C

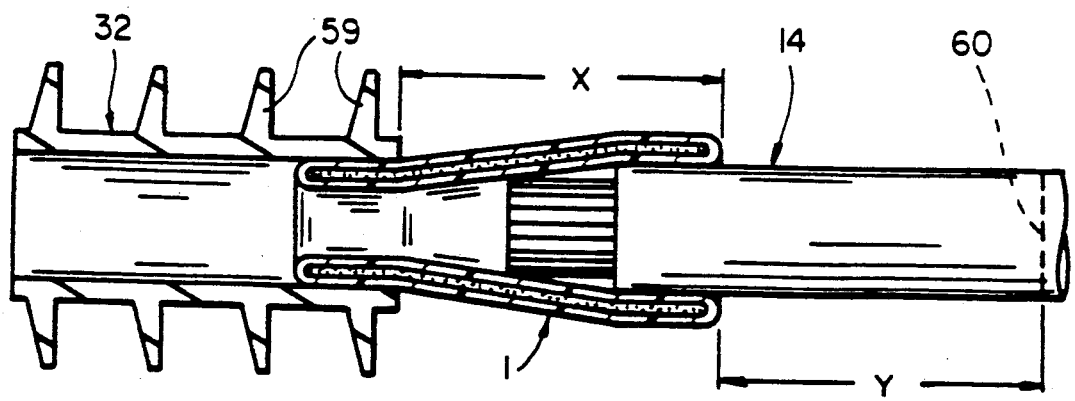
FIG_18A
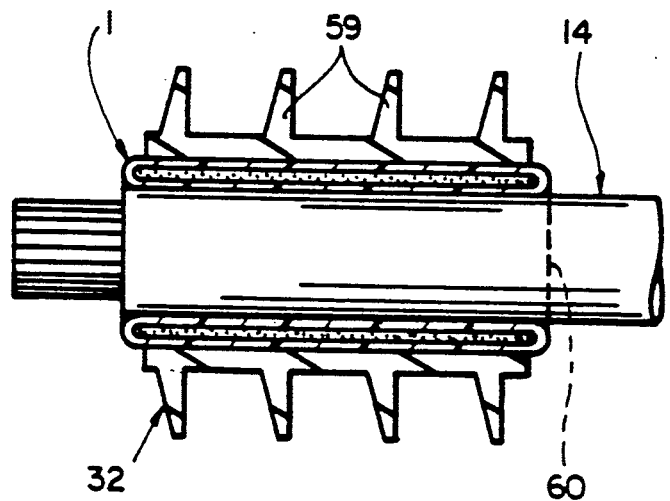
FIG_18B
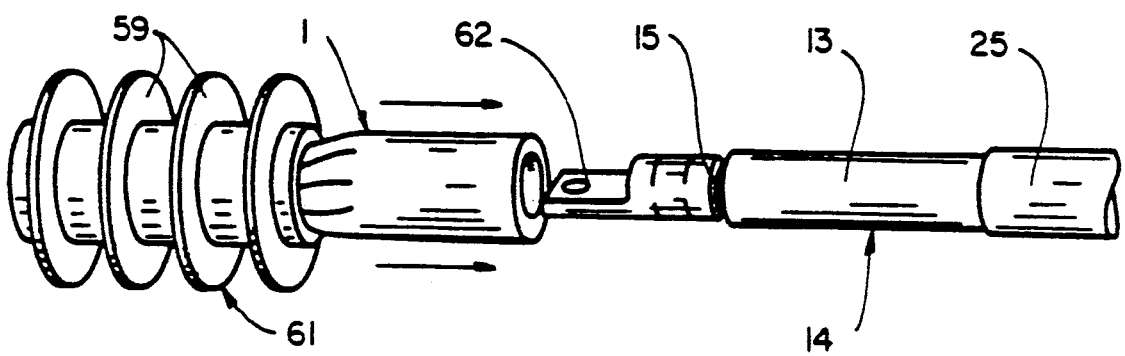
FIG_19A

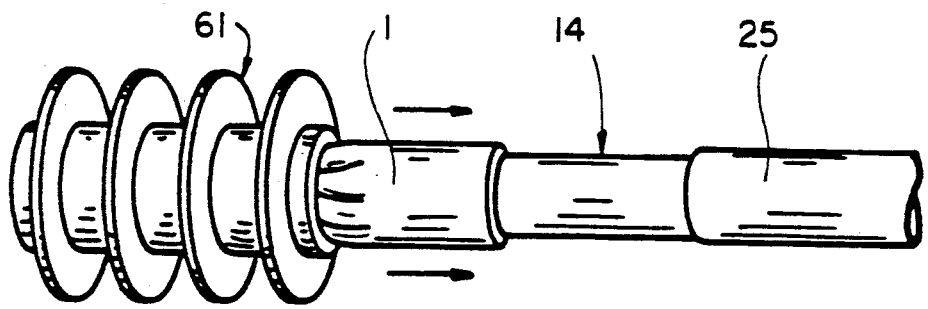
FIG_19B
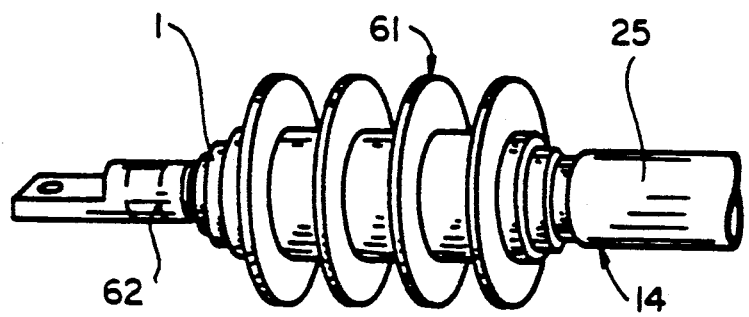
FIG_19C
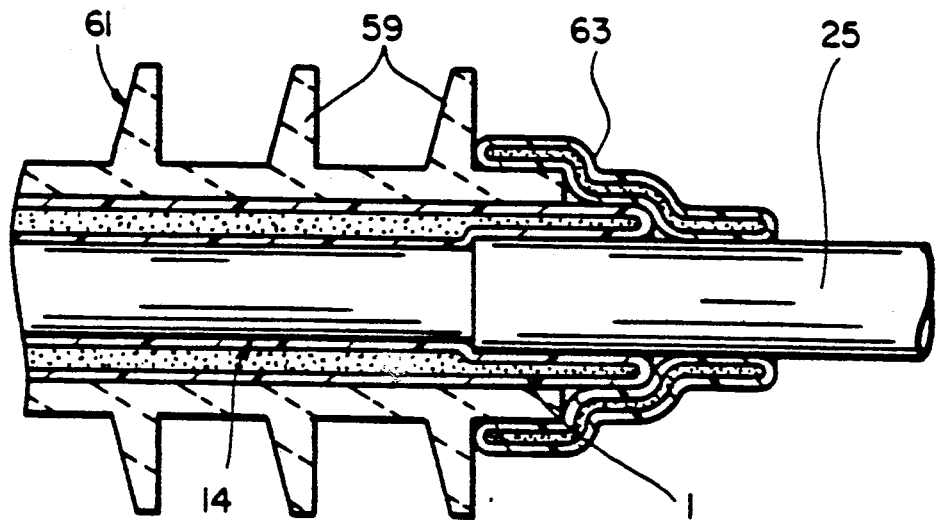
FIG_19D

TUBULAR ARTICLE

This application is a continuation of application Ser. No. 07/022,444, filed on Mar. 2, 1987, now U.S. Pat. No. 4,868,967, issued Sept. 26, 1989, which in turn is a continuation-in-part of application Ser. Nos. 06/835,066 filed on Feb. 28, 1986, now abandoned, and Ser. No. 06/835,067, filed on Feb. 28, 1986, now abandoned, and a continuation-in-part of Ser. No. 06/835,074, filed on Feb. 28, 1986, now abandoned, and a continuation-in-part of Ser. No. 06.907,200, filed Sept. 12, 1986, now abandoned, all of which are continuations-in-part of application Ser. No. 06/757,212, filed on July 19, 1985, now abandoned. The entire disclosures of these applications are incorporated herein by reference.

This invention relates to an article comprising a double-walled tube of a particular configuration, particularly one suitable for environmental protection, including electrical protection, and joining or mechanical holding of substrates such as cables and pipes. The article may also be useful as a blocking or delivery article.

Whilst the invention is not limited to any particular field of use, it finds particular applicability in the cable accessories and pipeline industries for protection and joining. Thus, the invention will be illustrated with reference to such uses.

It is often necessary to provide around a cable or pipe a covering to prevent environmental damage such as corrosion or to provide electrical insulation. The covering may comprise a tape-wrapping which, while applicable to a wide variety of sizes of substrates, requires skill for proper use, and even with skill is not long-lasting nor able to resist tough environments.

What is required is generally a tight fit over the substrate, an ability to be installed over substrates of various sizes, a certain life-time in service (in the cable accessories field often comparable to that of the cable, say thirty years) and some functional performance such as electrical insulation or water impermeability.

The poor sealing achieved with tapes has been overcome by the use of dimensionally-recoverable, generally heat-shrinkable, articles such as sleeves for example those disclosed in U.S. Pat. Nos. 3,086,242 to Cook et al, 3,279,819 to Wetmore and 3,455,336 to Ellis. Such articles, which are supplied in an expanded state, relax on heating. Thus a sleeve for example is easily positioned around a portion of a cable to be sealed, and is then heated causing it tightly to engage the cable. Shrinkage ratios of 3:1 or more are easily obtainable, hence any such shrinkable article may be used over a range of sizes of cable or over a cable of varying cross-sectional size. Heat-shrinkable articles have found wide us in the cable accessories and pipe-line industries and excellent performance can be obtained.

A disadvantage, however, remains. A source of heat must of course be provided, and this can in some circumstances be inconvenient. Furthermore, it has been customary, for all but the smallest heat shrink articles, to use a propane, or other open-flame, torch to cause shrinkage, which can be dangerous in some environments. For example, when a gas pipe or a cable running adjacent to a gas pipe is to be repaired, the gas supply may have to be shut-down and in some countries such uses of a torch are prohibited. Similar problems arise with mine cables.

This problem has led to a search for a cold-shrinkable product. Radially expanded elastomeric sleeves have been proposed that are held in an expanded configuration by means of a restraint. The expanded sleeve must then be separated from the restraint in such a way to permit it to recover towards its unexpanded configuration and into engagement with the cable or other substrate. Articles of this type are disclosed in U.S. Pat. Nos. 3,515,798 to Sievert, 4,070,746 to Evans et al, and 4,506,430 to Guzay. In the last of these an elastomeric sleeve is held in a radially expanded condition by an internal support. The sleeve is folded over itself with a lubricant between the folded layers. To apply the sleeve the upper layer is slid off the support onto the cable and the support is pulled in the opposite direction permitting the rest of the elastomeric sleeve to slide onto the cable. Application of a sleeve in this manner results in the lubricant being interposed between the sleeve and the cable. This can make sealing the sleeve to the cable using a sealant or adhesive difficult or impossible to achieve. Also, because the elastomeric sleeve is of necessity maintained in an expanded configuration during shipment and storage of the product, a problem known as "tension-set" arises. This problem is the tendency of the elastomer to become set in the expanded configuration such that on release from the restraint it does not fully recover to its original unexpanded configuration. A further disadvantage of this type of product is that the restraint adds to the cost of manufacture.

Another approach is to support the centre portion of an elastomeric sleeve in a stretched condition and roll the ends of the sleeve over the central support. In use the support and rolled-up sleeve are positioned over the substrate. Then the ends of the sleeve are unrolled bringing them into contact with the substrate. Such articles are disclosed in U.S. Pat. Nos. 3,878,320 to Mixon Jr. et al, and G. B. 2,099,638 to Pirelli. Again the article is maintained in an expanded configuration which can lead to tension-set.

A further approach is to use moulded separable connectors which provide an interference fit with the cable or other substrate to which they are applied. Each device must, however, be accurately sized to provide the necessary interference fit, and even then a seal can not be reliably made due to imperfection in the surface of the substrate. Such devices are generally referred to as "push-on" devices and an example is disclosed in U.S. Pat. No. 4,400,048 to Sacks.

Yet a different approach is disclosed in U.S. Pat. No. 3,897,088 to Beinhaur. There, a device similar to an inner tube for a tire is disclosed, whose diameter on inflation increases until it reaches a dimension greater than the outer dimension of the substrate over which it is to be installed. The device is then slid along the substrate to the desired position where it is deflated to cause it to engage the substrate. A disadvantage is the requirement for a tool in order to install or remove the device.

We have now discovered that tight engagement over substrates of various sizes can be achieved using a double walled tube that is able to revolve (to be explained below) and that is of a certain configuration and that has certain materials properties.

The mere idea of a double walled tube is of course known, for example from U.S. Pat. No. 3,978,531 to Ilon and U.S. Pat. No. 4,228,792 to Rhys-Davies. In the first of these, a double walled tube having a large volume of filling of gas between the two walls of the double wall is used for lifting a bed-ridden patient without hurting him. The tube is placed at the side of the patient and perpendicular to him and a rod is pushed into the remote end of the tube. Friction between the inner wall of the tube and the rod causes the tube progressively to turn itself inside out, i.e. to revolve, as the rod is pushed. Thus, the tube creeps under the patient. It would appear to be essential that the revolving action of the tube results from a compressive action between the two ends of the tube, i.e. between the patient's body (and the surface on which he is lying) acting on the outer wall of the tube at one end, and the rod acting on the inner wall at the opposite end.

The second specification just referred to is also from the medical art. It discloses a double walled tube, again with a high volume filling between the walls, that is revolved along a patient's arm to drive blood out of it, allowing application of a tourniquet in preparation for surgery. Before use, the tube is inflated between its two walls to such an extent that the inner wall collapses and the outer wall expands.

Use of each of these prior art devices consists in the action of moving it to a position which it temporarily holds, shortly after which the device is removed. The device is not carrying out its function when statically in position around a substrate. We have designed such a device of a configuration and materials properties that allow it to provide, for example, environmental sealing and other functions useful in the cable accessories, pipeline and other industries.

Thus, the present invention provides an article comprising a double-walled tube that can be continuously revolved along an elongate member by relative sliding motion (which could be pictured as shear) between the two walls of the double wall, substantially without relative sliding motion between a wall adjacent the member and the member, the double wall:
(a) defining a closed region between its two walls;
(b) having between its two walls a friction-reducing means comprising a solid or a liquid;
(c) comprising an elastomeric material, preferably having a secant modulus at 100% elongation of less than 24.7 Kg. per sq. cm. (350 psi);
such that if said liquid is non-setting, the volume of the closed region is such that when the article surrounds a substrate of a size such that its wall adjacent the substrate is under a positive tensile strain the average separation between its walls is less than 10 times its average wall thickness; and the tube being of such configuration that it will buckle, preferably bellows buckle or column buckle, rather than revolve if subjected to an axial compressive force applied between an outer wall at one extreme end and an inner wall at an opposite extreme end.

The reference to buckling rather than revolving is to be interpreted as follows. The compressive force is to be considered as applied gradually increasing from zero to a value which will cause either buckling or revolving. Doubtless any article will immediately buckle if subjected to a severe enough impact; we are concerned however with reasonable installation conditions. The above definition requires buckling if the force is applied between the extreme ends, and the relative sliding motion required of the present double-walled tube may be achieved by applying a compressive force between an inner wall at one end and an outer wall at a position close to that end. This is explained below in connection with FIG. 3A. The prior art article U.S. Pat. No. 3,978,531 (Ilon) requires the end-to-end compressive force to result in a revolving action.

By continuously revolving we simply mean that relative sliding motion or shear between first and second walls of the double wall can be continued such that the first and second walls exchange position and then return to their original configuration. We require only that such a complete revolution be achievable once, although we prefer that it can be continued as many times as desired. (A curable composition may be provided between the walls and curing may limit the time during which revolving is possible.) Thus, the article may be revolved along an elongate member and left in any desired position. The first and second walls may of course be indistinguishable from one another, except for the fact that at any given time one is an inner wall adjacent the substrate and one is an outer wall overlying the inner wall. Then the portion of wall material that constitutes each wall will continuously change as the revolving action takes place. When we refer to a first, second, inner or outer wall we refer merely to a portion of wall identifiable for the time being by its position and do not imply that it has any structural uniqueness. The revolving action may be pictured best perhaps by imagining a longitudinal axial section of the double-walled tube over a cylindrical substrate. The tube will appear as a Caterpillar-track on either side of the substrate (Caterpillar is a trade mark). The tube can progress along the substrate by the Caterpillar-tracks revolving. This involves shear between the inner and outer walls constituting the Caterpillar-track, and will generally avoid shear between the inner wall and the substrate.

When we refer to the double-walled tube we do not preclude additional walls or layers, providing the revolving action is still able to take place.

The article may comprise components in addition to the double-walled tube itself. For example, the tube may be part of a larger device, such as a housing of which the tube comprises an outlet. In a second example, the article comprises some sealing means in addition to the tube itself. In a third example the tube may be provided with some means such as a frame with which it is stabilized. In a further example the tube is provided with means blocking a passage therethrough such that the article may be used as an end cap. In this case the tube itself, although generally not the article, will be capable of continuously revolving as referred to above.

It is preferred that the tube has substantially uniform properties, particularly unstressed circumference (it may, but need not, be circular in cross-section), through substantially the length of its inner and outer walls. This is preferred in order that the article will have the same functional performance, for example sealing properties, irrespective of the position along a substrate onto which it is revolved. Such uniformity of unstressed circumference will result if the double-walled tube is produced by turning a flexible tube inside-out (or outside-in) along half of its length so that originally opposite ends are joined together. The friction-reducing means is provided within the resulting double-wall. The double-walled tube may be made by joining together respective ends of two concentric tubes: in this case there will generally be a difference in unstressed circumference between what is initially the inner and what is initially the outer wall, but it need not be substantial. Preferably the maximum unstressed circumference along the inner and outer walls is less than 20%, more preferably less than 10%, especially less than 5%, particularly less than 2% greater than the minimum unstressed circumference, based on the minimum.

The article of this invention may be of any length, and it will generally be less than 30 m (100 feet) and more frequently less than 15 m (50 feet). Typically articles of this invention are from about 5 cm (2 inches) to about 130 cm (50 inches) in length, and in particular are from 13 cm (5 inches) to 80 cm (30 inches) in length depending on the substrate over which they are to be used.

The outer diameter of the article similarly can be of any desired size, and typically is less than 125 cm (50 inches) generally less than 50 cm (20 inches), preferably from 2.5 cm (1 inch) to 15 cm (6 inches) depending on intended use. The inner diameter is preferably from 0.2 cm–120 cm, more preferably 0.5 cm–50 cm, especially 1 cm to 10 cm.

The ratio between the length and outer diameter of the article will also depend on the use to which it is to be put. We prefer, however, that that ratio is more than 5, more preferably more than 7, especially more than 8. Typical values are from 5–12. Articles of such shape, particularly with a low volume of friction-reducing means within the double wall, will tend to buckle (rather than revolve) if subjected to an axial compressive force applied between an outer wall at one extreme end and an inner wall at an opposite extreme end. As a result a preferred technique whereby articles of the invention are installed is as follows: the revolving action is at least initiated by applying a shear force between the inner wall at one extreme end (by means for example of an end of a substrate to be covered) and the outer wall at a position a short distance, say less than 7 cm, preferably from 0.5–5 cm, from that same end (by means for example of an installer's hand). This technique is particularly relevant to a preferred use of the article where both the inner and outer walls are under tension when the article is installed on the substrate, as is required if an environmental seal is to be reliably achieved. Both the inner and outer walls must therefore be expanded as the article is revolved onto the substrate, and that portion of the outer wall which is over the substrate will generally be under greater tension than the remainder that has yet to reach the substrate. This difference in tension will tend to drive any fluid separating the inner and outer walls towards the end of the article yet to reach the substrate, i.e. towards the end of less tension. The inner and outer walls at the end over the substrate will cease to be separated, and friction will bring the revolving action to a stop. Hence the preference for the means, to be discussed below, restricting displacement of the friction-reducing means. It may be noted here that the high filling volumes disclosed in connection with the superficially related double-walled articles of the prior art, required there because of the different functions and installation techniques of those articles, obviate this problem of displacement of any fluid separating the walls. The reason is that the outer diameter of the article is in general larger than that of the substrate, and the inner wall is initially collapsed completely and does not need to be expanded for the article to function as disclosed.

When the article has been revolved onto a substrate of such a size that its wall adjacent the substrate is under a positive tensile strain, we prefer that the outer diameter of the tube (i.e. of the outer wall) is 1.5 or less, preferably 1.3 or less, especially 1.2 or less, times the inner diameter of the article (i.e. of the inner wall). Most preferably they are substantially equal since the separation between the walls is preferably small, as mentioned above, and the wall thicknesses are also preferably small compared to the diameter of the tube. The separation between the walls was given above as less than 10 times the average wall thickness, and preferred values are less than 8, especially less than 5, particularly less than 2, more particularly less than 1, and generally greater than 0.0003, typically from 0.001 to 0.5.

The inner and outer walls are each preferably from 0.0025 to 1.3 cms (0.001 to 0.5 inches) thick, more preferably from 0.05 to 0.65 cms (0.02 to 0.25 inches), and most preferably from 0.15 to 0.25 cm (0.05 to 0.1 inch) thick. The material comprising the walls should of course be sufficiently flexible that the revolving action may take place, and it preferably has an elongation to break of at least 20%, more preferably at least 40%, especially at least 100%, more especially at least 200%, particularly at least 500%, more particularly at least 700%. These figures relate to the ASTM test D412-83.

The degree to which the walls of the article may be stretched will determine the maximum size of substrate over which the article may be installed. Preferably, the outer diameter of the substrate is from 1.0 to 8 times the inner diameter of the article of the invention. Preferred ranges are from 1.1 to 5, especially from 1.1 to 2.5. Where the article is to be used, for example to seal a cable or pipe and a separate sealing material, such as a mastic, is used to enhance the seal, the diameter of the substrate should be taken as including the sealing material. For some uses, for example delivery of an expandable article over a substrate, a seal between the article of the invention and the substrate may not be desired, and the inner wall need not then be under a positive tensile strain when over the substrate. In such instances the inner diameter of the article may be greater than the outer diameter of the substrate. The substrate outer diameter is then preferably at least 0.75, especially at least 0.9 times the inner diameter of the article.

The ease with which the article can be installed over a substrate of larger size will depend on the tensile stress of the material comprising the walls. We prefer that the article can be installed by hand over substrates having the size ranges given above, using the technique disclosed above whereby a shear force is applied between the end of the article and a position close to that end. We prefer that the material has a secant modulus at 100% elongation, as determined by ASTM D412-83 of 21.1 Kg. per $cm^2$ (300 psi) or less, more preferably 14.1 Kg per $cm^2$ (200 psi) or less, particularly 10.6 Kg per $cm^2$ (150 psi) or less, especially 9.2 Kg per $cm^2$ (130 psi) or less. A useful range is from 5.6 to 10.6 Kg per $cm^2$ (80–150 psi). A Shore A hardness as measured by ASTM D2240 of less than 90, preferably less than 60, more preferably less than 40, will be preferred for many uses. The material preferably has an ultimate elongation to failure of at least 150%, more preferably at least 500%, especially at least 900%. A low temperature brittleness as measured by ASTM D746 of −20° C. particularly −40° C. is preferred.

The material comprising the double-wall will be chosen from at least two considerations. Firstly it must allow the revolving action necessary for installation onto or use along a substrate of a certain size or shape or substrates of a certain range of sizes and shapes. The properties of interest here will include flexibility, tensile stress at a chosen elongation, elongation to break and ability to retain the friction-reducing means. The second consideration is the functional requirement of the installed product. For example, if it is required to provide environmental protection it may need a certain mechanical strength, abrasion resistance, cut resistance, moisture impermeability, etc. If it is to have an electrical function it may be required to be of high resistivity as an insulator, of low resistivity as a screen or other conductor, of intermediate resistivity as for stress-grading. It may have a certain specific impedance at a certain frequency, it may need anti-tracking properties, or it may need resistance to corrosion under high electrical discharge, etc. Where it is to be used in difficult environments it may need compatibility with certain sealing materials, U.V. resistance, fungal resistance, oxidation resistance, resistance to stress-relaxation, flame resistance, resistance to solvents, or low water up-take, etc. Such features are known to be required of certain prior art products, for example heat shrinkable sleeves, and the man skilled in the art of polymer formulation will know how to prepare suitable materials. After reading this specification he will be able to prepare various new and inventive articles that combine the ability to be installed by the revolving action described herein, and any one or more of the above functional requirements.

Examples of elastomers that may be employed to form the walls of the article include: natural rubber, polyisobutylene, polyisoprene, isobutylene-isoprene copolymers, polybutadiene, styrene-butadiene copolymers, ethylene-propylene copolymers, ethylene-propylene diene terpolymers, polychloroprene, acrylic rubbers such as ethylene-ethyl acrylate copolymers, epihalohydrin homopolymers and copolymers, nitrile rubbers such as acrylonitrile-butadiene copolymers, silicone rubbers such as polydimethyl siloxane, polysulphides, fluorocarbon elastomers such as hexafluoropropylene-tetrafluoroethylene co- and ter-polymers, polyurethanes and the like. Thermoplastic elastomers such as segmented polyether ester block copolymers, polyester urethanes, polyether urethanes, and the like may also be used. The polymeric material may contain a plasticizer, such as an oil, reinforcing fillers, stabilizers, flame retardants, additives to improve the electrical properties such as anti-tracking additives or conductive particles and the like. A preferred polymeric material for certain uses is disclosed in commonly assigned patent application Ser. No. 020 633 filed 3/2/1987 filed concurrently herewith, the disclosure of which is incorporated herein by reference. The polymeric material may, but in general will not, be heat-shrinkable to produce additional compressive force on the substrates. The material may be cross-linked, for example chemically or by electron beam radiation.

Other materials that may be incorporated include thermoplastic polymers such as elastomers, or metals, for example aluminum or steel. Metals are preferably used in the form of a foil having a thickness from 0.00025 to 0.013 cm (0.0001 to 0.005 inches). Such foils are sufficiently flexible and, if desired, can be elastically and/or plastically deformed, for example by corrugation. These materials may be used alone, as strips or other regions, interspersed with strips or other regions of elastomer, laminated or deposited over part or all of an elastomeric wall, or in other ways. A metal layer may be provided for example as a moisture vapour barrier, or to render the article conductive for the purposes of providing an electrical screen etc. The foil is preferably located as close as possible to the material axis of the tube.

The walls may comprise a fabric, for example a braided, or woven or knitted tubular fabric, optionally together with a matrix material by means of which it is rendered substantially impervious. One or two or more different fibres may be used. In general the following fibres may be incorporated: elastomeric, thermoplastic, cellulosic, proteinaceous, glass, ceramic, metallic, or the like, or mixtures of these. The construction of the fabric preferably permits radial expansion of the double-walled tube. Heat-recoverable fabrics may be used to provide additional compressive force on the substrate. Where suitable, the elastomers listed above may be used in fibrous form.

The walls may comprise a composite material, for example an elastomeric material reinforced with fibres or with a fabric. The reinforcing fibre may comprise polymeric, glass, cellulosic, carbon, graphite, metallic, ceramic or the like materials. The fibres may be oriented, for example axially with respect to the tube, for improved tensile strength. Furthermore, the walls may comprise segments, for example strips, of different material to provide different properties along the walls, if desired. The walls should, however, in general be sufficiently flexible over their entire surfaces that the revolving action can easily occur.

Each wall of the double-walled tube may comprise a plurality of layers of material formed, for example, by lamination or co-extrusion. For example, one or both of the inner and outer walls may comprise an interior layer (i.e. the layer facing the closed area within the double-wall) of, say, butyl rubber which is an effective gas diffusion barrier or a metal layer as mentioned above, and an exterior layer of, say, ethylene-propylene-diene terpolymer rubber which has excellent weathering properties. Similarly, a combination of electrical properties or chemical properties may be provided.

The two walls that make up the double-wall may comprise the same or different materials, and be of the same or different thicknesses. If they are to be of the same material and thickness it may be preferred to make the article by partially turning a single tube inside-out, or outside-in, and joining its ends together. Where the two walls are to differ, another technique may be preferred, such as joining together respective ends of two concentric tubes. Such tubes may be made for example by extrusion or moulding.

The joints between the ends may be permanent or of a temporary nature, for example by means of a recoverable clamp or patch. The ends may be joined directly or by the use of one or more additional segments of material preferably flexible, between them. Such a segment may for example comprise a tubular strip of slightly smaller or larger diameter than the tube ends to be joined, and may be positioned to bridge a butt joint between those ends. Thus, the article may contain wall segments additional to those of the double walled tube proper.

When the ends of the tube or tubes are joined together in this fashion a double-walled tube is produced having a closed space between the walls. The friction-reducing means may be supplied before the ends are joined (this includes embodiments where the surfaces of the tube or tubes have been treated or where they inherently have low-friction surfaces which then may constitute the friction-reducing means) or the friction-reducing means may subsequently be inserted through a sealable opening such as a valve. The inner and outer walls are then capable of relative shear as the article revolves axially. The article need not be restricted to axial motion, and a certain degree of radial and/or circumferential relative motion between the walls may be possible.

The friction-reducing means will in general require some means to prevent or restrict its own displacement at least during initial revolving action onto a substrate. Before preferred examples of the friction-reducing means are given therefore, the means for restricting displacement will be explained since in preferred embodiments it is a property of the friction-reducing means rather than something physically separate. The reason for uninhibited displacement of a separating fluid possibly being a problem in the context of the present invention, but apparently of no concern in the prior art, was discussed above, but may be repeated here. When both walls have to be expanded as the article is revolved over an end of a substrate, a separating fluid has a tendency to be driven away from that region of the tube subjected to greatest expansion which, unfortunately, is where it is needed. This problem is not noticed with a high volume filling where expansion of the inner wall is not required since the substrate may have a diameter smaller than the diameter of the outer wall, and in any case there is a vast amount of separating fluid present. Such an article is however wholly unsuitable for solving the problems that the present invention addresses.

Whilst we wish not to be bound by any theory, we believe that the friction-reducing means, when a liquid, serves by maintaining hydrodynamic lubrication, presumably in addition to boundary lubrication. We prefer that lubrication can be maintained between the two walls of the double-walled tube under a pressure gradient of 27 kPa per cm. In the absence of the means for restricting, substantially all separating fluid may be displaced, possibly leaving an adsorbed mono-molecular layer of lubricant at each surface. The conditions under which hydrodynamic lubrication (or whatever phenomenon is responsible) must be maintained will of course depend on the particular application but the following information may be helpful. Displacement of friction-reducing means may be rate dependent, and a very quick installation may be successful where a slow one is not, simply because less time is available for the friction-reducing means to be displaced. Nonetheless, some means for restriction will be preferred and a simple gas (which is preferred in the prior art double-walled tubes, but whose sole presence is excluded from the article defined above) being perfectly fluid and having no means to prevent its displacement will generally not function as desired, however quickly one attempts to install the article. Furthermore, the speed at which one is able to install the article will depend on its size, and on the shape and size of the substrate over which it is to be revolved. The article may be used to install an elastomeric article over a substrate under conditions where the elastomeric article has to be stretched, and the tendency for the lubricant to be displaced must again be taken into account. If the substrate has any sharp changes in size along its length (known as transitions in the cables art) such as may occur at a cable splice and of course at an end of a cable, the problem may be particularly acute since the effect may be to wipe the friction-reducing means away from the leading end of the double-walled tube. A further consideration is whether the article is to be installed once and left installed, or whether subsequent removal (referred to as re-entry in the cables art) is likely. In the latter case it is desirable that any transitions over which the installed article is to lie to do not cause total displacement of friction-reducing means such as would prevent re-entry. If this is found to have happened, re-introduction of friction-reducing means to the desired portion of the tube may be possible by massaging the tube or by other means. It can be seen therefore that this long-term restriction of displacement is not essential, and in many instances may not be possible, bearing in mind that many years may elapse between installation and re-entry.

The friction-reducing means may be restricted from displacement by its being physically attached to the inner and outer walls. For example, the walls may have a low friction coating. A second possibility is the provision of some means that deforms a second region of the article, preventing flow of friction-reducing means away from a first region where it is needed.

We prefer, however, that the friction-reducing means is a liquid having such rheological properties that it can continue to provide hydrodynamic lubrication under the conditions described herein. We prefer also that the liquid wets the surfaces of the wall of the double-walled tube, preferably at a dihedral angle of less than 80°, more preferably less and 45°, especially less than 30°. The correct rheological properties and the ability to wet the walls result, it is thought, from some sort of weak bonding network throughout the friction-reducing system to the walls that allows the walls to slide past each other in shear but resists displacement of the friction-reducing means that would otherwise occur due to the tension in the outer wall and the force of installation which effectively forces the two walls together.

Preferred behaviour of the lubrication system is reflected in such properties as the change in viscosity with shear rate. We prefer in fact that the friction-reducing means is a non-newtonian particularly highly non-newtonian liquid (which term includes semi-solid). It is preferably pseudo-plastic (viscosity decreases with increasing shear) and/or is a bingham fluid (which means that it has certain non-zero yield stress). Preferably the viscosity at 20° C. is less than 10,000, especially less than 5,000, particularly less than 1,000 centipoise at shear rates of greater than or equal to 100, particularly greater than 500, especially greater than 1,000 reciprocal seconds. We also prefer that the viscosity at 20° C. at a shear rate of 1 reciprocal second is greater than the following, in order of ascending preference : 1, 50, 100, 200, 5,000, 10,000 centipoise.

We have discovered that in addition to preferred absolute values of viscosity the rate of decrease of viscosity with shear rate, i.e. the degree of non-newtonian behaviour, is important. We particularly prefer that, at least over a range of from 1–100 reciprocal seconds, the viscosity drops by at least a factor of 5, 10, preferably 15, especially from 15–30. This factor is not particularly temperature dependent, and we prefer that it holds at 20° C.

A further property desirably possessed by the friction-reducing system is pituity. This property is related to the cohesive strength of the liquid and can be pictured as stringiness. It may be quantified in terms of extensional viscosity.

Pituity may be measured as follows. A sample of the liquid to be tested is placed in a tin can approximately 0.5 liters and of approximately 8 cm diameter, to a depth of at least 5cms. A blade is inserted in the liquid and the force required to remove it is measured using an Instron (trade mark) Tensometer model 112 equipped with a 2 kg load cell. The Instron is calibrated to 100 grams full scale. The blade (which preferably has at least one hole therethrough to increase drag caused by the liquid) is placed vertically in the upper jaw. At 100 grams full scale the Instron recording pen i set to zero. The scale is then changed to 20 grams full scale and the pen rebalanced to zero. A chart recorder set to 200 mm per minute is found to be suitable for recording the results. The can with the liquid is placed under the blade so that the blade is centred. The cross heat is moved so that the blade just contacts the surface of the liquid, and this is done at an approach speed of 20 mm per minute. The counter is set to 000 mm, the cross head to 50 mm, and the stop mode is activated. The liquid is then entered, when the minimum limit is reached a stopwatch is started. The counter is reset to 000 mm, the minimum limit is deactivated, and the cross head speed is set to 1000 mm per minute.

After 25 seconds the recording chart and the pen are started. After 30 seconds the cross heat is started in an upwards direction.

The force is recorded as a function of time. The curve obtained shows a sharp spike indicating a sudden force which then dies. This is due to the inertia of the blade. The spike may be ignored. The force then rises quite sharply with time to reach a peak value (Fp grams) and it then decreases gradually. Down to some residual value which represents the weight of the liquid remaining on the blade after it has been removed from the bulk of the liquid.

The peak force (Fp) and the area under the curve as defined by this test give an indication of the pituity of the liquid. The area under the curve is taken as the area bounded by the upper part of the curve and the time axis and a straight line extension of the rise side down to the time axis, and tangent to the inflection point of the fall side down to the time axis. The area is given herein as E in units of grams second. Three measurements of each liquid are to be made, if possible, and an average taken.

We prefer that the friction-reducing means has a pituity given by Fp greater than 1 gram, preferably greater than 1.5 grams, especially greater than 2 grams, particularly greater from 1.5 to 7 grams, more particularly greater than 10 grams. The value will generally be less than 30 grams.

The value of E is preferably greater than 4 grams, especially greater than 5 grams, particularly greater than 10 grams, more particularly from 15 to 100 grams. The value will generally be less than 200 grams.

We prefer that the friction reducing means has an Fp value within the above ranges and an E value within the above ranges.

The above properties of the friction-reducing means should apply under installation conditions, particularly at ambient installation temperatures which may range at least from −40 to +60° C. but is more usually −10 to +25° C., and they are desirably maintained if re-entry is desired. In many instances however the article may experience high temperatures during service which may alter the properties of the friction-reducing means, for example pituity may be reduced after high temperatures or prolonged lifetimes. The man skilled in the art after reading this specification will be able to design a suitable lubrication system where loss of pituity is minimized. A shelf-life of 1 year at 50° C., especially 2 years at 60° C., is preferred.

The following liquids (which term includes compositions often referred to as gels) may be used as the friction-reducing means: a polyhydric alcohol such as glycerin or a glycol, or polyhydric alcohol-based or water based solutions containing a soluble polymer such as a polyacrylate, poly-methacrylate, polyacrylamide, polyethylene oxide, polyamide, polyamines, guar gum, xanthum gum, alginate, maleic anhydride copolymers, polyvinyl pyrrolidone, polyvinyl alcohol, cellulose derivatives such as hydroxypropyl cellulose, carboxy methyl cellulose and hydroxy ethyl cellulose; oils, such as silicone oils, hydrocarbon oils, mineral oils and vegetable oils. Where solutions, or other combinations of a dispersed and a continuous phase, are used, dispersing, solubizing, gelling or other stabilizing agents may be used. Such agents are thought to act by making possible an extended weak hydrogen-bonded or ionic-bonded matrix throughout the liquid that can be ruptured by shear.

Preferred solutions having a high pituity comprise very dilute solutions of very high molecular weight, generally slightly gelled, polymers. Molecular weights greater than 2 million, especially greater than 4 million are preferred, and concentrations from 1 to 8%, especially 2–6%, particularly about 3% by weight are preferred. A commercially available example is an aqueous lubricant called Polywater F ™ from American Polywater Corp. of Stillwater Minnesota.

Thickened aqueous or non-aqueous polymeric solutions are however preferred. A first example is a solution comprising about 90% by weight propylene glycol, 0.05 to 5% preferably about 0.5% by weight slightly anionic polyacrylamide having a molecular weight greater than 6 million, and the remainder water. The primary function of the water is as a solubilizing agent for the polyacrylamide. A second example is a solution comprising 0.05 to 5% by weight polyethylene oxide in water. A third example is a solution comprising 0.05 to 5% of polyacrylamide in water. Further ingredients such as biocides, boundary lubricants or stabilizers may be added.

The intended use of the article of the invention may restrict the type of lubrication system that can be used. For example, if the article has to be installed at high temperatures or will experience high temperatures once installed, it may be desirable to use a lubrication system based on a liquid of low vapour pressure at such temperatures in order to avoid inflation or bursting of the double-walled tube. A particular instance is the use of the article over a high voltage cable, for sealing a splice or for other purposes. Whilst such cables are intended to operate at about 90° C., higher temperatures can arise and accessories used in conjunction with such cables are expected to be operable up to 130° C. Thus, we prefer that the article of the invention can function at 130° C. and in particular that the lubrication system has a vapour pressure at 130° C. that is insufficient to expand significantly the walls of the double-walled tube. Preferably therefore the lubrication means has a boiling point of greater than 130° C. under the conditions pertaining within the double-wall, and we further prefer that its vapour pressure at 130° C. is less than 1 bar.

Further desired properties of the friction-reducing means include low or zero permeability through the walls of the double-walled tube, and low toxicity.

In some embodiments solids or semi-solids may be preferred. Semi-solids that can be used include greases, pastes and the like. Examples of greases include those having NLG ratings of 00 or 000, such as MAG-00 manufactured by Fiske Brothers Refining Co. of Toledo Ohio.

Solid materials that may be used include particulate materials, for example powdered talc, corn starch, graphite powder, glass beads, ceramic beads, polymeric beads, for example of polytetrafluoroethylene, metal balls, for example of iron or low melting alloys or the like that can impart conductive or magnetic properties etc. to the article. A continuous solid friction-reducing means may also be used as an integral part of or adhered to or may comprise the interior surface of at least part of one or both of the walls. The solid is preferably one that has a good lubricity or relatively low coefficient of friction, for example ultra high molecular weight polyethylene, polytetrafluoroethylene etc.

Where the lubrication system is other than an integral part of the walls, the amount of it is preferably determined in terms of its thickness as discussed above. In addition to that determination, it is preferred that its weight is preferably less than 10 times the weight of the walls of the double-walled tube, more preferably less than 5 times, especially less than 1 times, particularly less than 0.5 times.

If greater amounts of friction-reducing means are used the double-walled tube may balloon or form an aneurysm when the article is applied over a substrate, particularly if the substrate is of significantly larger diameter than the diameter of the inner wall.

In other words, if too much lubrication system is present for the walls to be able to maintain it substantially uniformly distributed, installation may become difficult or impossible over certain substrates. Also, failure at a bond or other join between the inner and outer walls may occur.

In some instances it may be desirable that the lubrication system hardens after the article has been installed. Such hardening may be reversible as may be useful if re-entry is required. When hardening takes place the extent of filling between the walls may be greater than where it does not since a stable and tough installed product may still be obtained. The hardening may result from chemical curing, for example of a latent curing adhesive system within the double wall. Such a curing system may comprise the lubrication system or it may be in addition to it. Examples of curing systems include epoxies, acrylics and polyesters and RTV silicones. Cure may be initiated by application of heat, destruction of a physical barrier that separates the curing components, mechanical mixing of the components, introduction of an accelerator, introduction of one or more of the curing components, application of an electric or magnetic field etc. either prior to or after the article has been positioned as desired on a substrate. Such systems generally cure to form a highly cross-linked structure which is sufficiently rigid to prevent further revolving action and to form a mechanically strong or pressure-retaining enclosure around the substrate.

Other hardenable systems include fusible materials for example metals and hot-melt adhesives, which may be heated before installation and then merely allowed to cool.

The article may be used in conjunction with a sealing material or other means to prevent or restrict its revolving action once properly installed on a substrate, or to provide or supplement an environmental seal, for example against ingress of water or other contaminant, or for pressure retention within the substrate.

For example, revolving may be prevented or restricted by mechanical means such as a blocking element placed at an end, or preferably both ends, of the article, or by taping an end of the article to the substrate, or by application of a clamp such as a hose clamp around the article, or, depending on the friction-reducing means, by puncturing the outer or inner wall or otherwise releasing the friction-reducing means.

A sealing material may be provided between the inner wall and the substrate or between the outer wall and some other object with respect to which movement is to be prevented. Such sealing material may be supplied on a surface of the substrate, on a wall of the article or as a discrete component that is positioned as desired during installation of the article. For example, the sealing material may be provided in sheet form (which includes tapes, strips and bands), either alone or on a backing material, which may be wrapped around the substrate.

The combination of the article and a sealing material is a beneficial one. It is of course known to provide environmental protection by means of a sealing material and some prior art cover whose function is to deliver the sealing material or to maintain it in position around a substrate against any mechanical forces that would displace it. The cover is desirably tight-fitting and is able to apply some compressive force to the sealing material; installation, of course, is therefore a problem since any sliding action will tend to drive the sealing material away. The problem is overcome by the use of the heat-shrinkable sleeves mentioned above, but they of course have the disadvantage in practice of requiring use of an open flame.

The article of the invention is able to apply a compressive force to a sealing material, forcing it against a substrate, whilst avoiding any shear that would tend to displace it during installation. This is of course due to the revolving action whereby relative sliding motion occurs between the inner and outer walls, rather than between the inner wall and the substrate. Thus, the article may be used to deliver to or otherwise to force a sealing material against a substrate, after which the article may be removed or left in place. The article could also be used to deliver or otherwise to force a sealing material against the inside of a pipe or against some other concave surface.

Sealing materials that may be used with the article for sealing or locking purposes include adhesives, sealants, gels and cement, mortar or concrete, etc. The sealing material may be in any suitable form, but it is preferably solid or semi-solid, especially in tape or block form.

Adhesives include contact adhesives, pressure-sensitive adhesives, curing adhesives and hot-melt adhesives (the advantage of the invention over heat-shrinkable materials need not be removed by use of an adhesive requiring heat since the temperature and quantity of heat required may be much less). Particularly useful pressure sensitive adhesives in tape form are disclosed in GB 2,133,026 (Raychem). Curable adhesives may comprise for example epoxies, acrylates or unsaturated polyesters, an anaerobic adhesive such as cyanoacrylate being specific example. One component of a two or more part curing adhesive may if desired be placed on the substrate, and another component on a wall of the article, for example the outer wall since that will become the inner wall in contact with the substrate after a certain extent of revolving. Curing adhesives should be selected to provide the desired shelf-life etc.

Preferred sealants include mastics, oils and greases such as those disclosed in U.S. Pat. No. 3,297,819 to Wetmore, which comprises substantially non-crystalline materials generally having a viscosity of not more than $10^{13}$ centipoise at 25° C. Such a material may flow under the compressive force provided by the article of the invention to fill any voids or other leak paths to the underlying substrate. This ability to flow means that the resulting environmental seal will be tolerant of small degrees of movement of the substrate (such as bending and thermal expansion and contraction, and vibration, etc.) and any small voids that may form may self-heal under the continued tension provided by the article.

A third, and preferred, category of sealing materials that may be used with the article is a gel, by which we mean a material preferably having a cone penetration of from 50 to 500 $(10^{-1}$ mm) and an ultimate elongation of at least 100%. Cone penetration values are as determined by a method based on ASTM D217-68 at 21° C. (70° F.) $\pm 3°$ C. on an undisturbed sample using a standard 1:1 scale cone (cone weight 102.5 g and shaft weight 47.5 g), the penetration being measured after 5 seconds. The ultimate elongation values are as determined by a method based on ASTM D638-80 at 21° C. (70° F.) $\pm 3°$ C. at a speed of 50 cm per minute.

Preferably the cone penetration is from 100-350 $(10^{-1}$ mm), more preferably from 150-350 $(10^{-1}$ mm). We prefer that the ultimate elongation is at least 200%, more preferably at least 500%. Furthermore, we prefer that the gel has an elastic modulus of less than $10^8$ dynes/cm$^2$, more preferably less than $10^7$ dynes/cm$^2$, particularly less than $10^6$ dynes/cm$^2$, more particularly less than $10^5$ dynes/cm$^2$. These figures are as measured at 21° C. (70° F.) $\pm 3°$ C. using a parallel plate rheometric test at a frequency of 1 Hz.

The precise material chosen as the gel will depend on the application, and it may be used in a wide variety of applications particularly where deformation into intimate contact with a substrate, often of awkward or unpredictable shape, is necessary for sealing or other purposes, and where clean re-entry is likely to be required. Where environmental sealing is required, moisture resistance will generally be desired, and resistance to fungal or other degradation will be useful. The gel should be compatible with the materials of the article and substrate, and may have surface tackiness to hold it in place during installation.

Electrical insulation may be required, in which case the gel preferably has a resistivity of at least $10^9$ ohm cm, more preferably at least $10^{10}$ ohm cm and for high voltage applications preferably at least $10^{12}$ ohm cm and a dielectric constant of from 2-6.

Where high temperature performance is required, for example in connection with high voltage cables, a material of the following type may be preferred. This material is referred to herein as a gelloid composition since, although it will in general have the appearance associated with the gels referred to above, it may have (although it preferably does not) cone penetration values or elongation values outside the above ranges, and may have a low gel fraction such as less than 15%. Gelloid compositions may comprise: a cross-linked non-silicone polymer having an olefinic unsaturated content of less than 10 mole per cent and having 0.1-3 cross-links per weight average molecule; a liquid dispersed in the polymer in an amount of from 20-95% based on the weight of the dispersed liquid and the polymer; and a filler dispersed in the polymer and/or liquid at a volume fraction V of from 0-0.3 based on the polymer, liquid and filler; the composition preferably having a storage modulus of $(1 + 2.5 v + 14.1 v^2)X$ dynes/cm$^2$ where X is less than $5 \times 10^5$ at 30° C. and greater than $5 \times 10^3$ at 90° C.; the composition preferably having a dynamic viscosity of $(1 + 2.5 v + 14.1 v^2)Y$ poise where Y is less than $1 \times 10^5$ at 30° C. and greater than $3 \times 10^3$ at 90° C.; and the composition preferably exhibiting first degree blocking.

In some instances, a degree of electrical conductivity may be desirable, for instance to fill voids around electrical components such as crimps used to connect high voltage electric cables, and stress-grading materials may be used to prevent electrical discharge. Thus a gel may be used that has a DC resistivity of from $10^7$ to $10^{11}$, preferably from $10^{10}$ to $10^{11}$ ohm.cm and a specific impedance of from $10^7$ to $10^{10}$ ohm.cm at 60 Hz.

Conductive gels may also be used, suitable resistivities being less than $10^4$ ohm.cm, preferably less than 100 ohm.cm.

Suitable gels may for example be made by gelling curable polyurethane precursor materials in the presence of substantial quantities of a mineral oil, a vegetable oil, or a plasticizer or two or more of these materials. Suitable quantities are 60-80% in the case of oil (particularly of a 1:2-5 mixture by weight of mineral oil to vegetable oil), and 30-70% in the case of a plasticizer such as trimellitate.

Gels may also be made by curing reactive silicones with non-reactive extender silicones.

The liquid polymer preferably comprises a butyl rubber, an epichlorohydrin rubber, an ethylene-propylene-diene monomer rubber, a hydrogenated styrene-butadiene rubber, a nitrile rubber or a functionalized polyisobutylene. The dispersed liquid preferably comprises a paraffinic oil, naphthenate oil, aromatic oil, liquid polybutene, alkyl or aryl phthalate, vegetable oil, mineral oil, trimellitate, ester of a polyethylene glycol, alkyl or aryl phosphate, methyl ester of hydrogenated wood rosin, liquid rosin oils, pine fat, polyterpenes, non-reacting liquid rubbers, etc. The filler may for example comprise any solid additive including particulate or fibrous matter and may function as to aid thermal or electrical conduction, for example for stress-grading purposes. Examples include carbon black, barium titanate, zinc oxide, iron oxide, silicon carbide, metals and the like, reinforcing agents, thermal stabilizers, fungicides, biocides, flame-retardents, for example aluminium trihydrate and halogenated flame-retardents, leak indicators, corrosion inhibitors, ultra-violet light stabilizers, processing aids, and impact modifiers. These additives may also be used with any of the other materials discussed herein.

A gel may be provided in the form of a tape, for example impregnated into an open-cell foam or other perforate backing layer.

We will now describe in general terms some preferred embodiments of the invention. In each case a sealing material may be applied to the substrate and/or to the article and an article comprising a double wall then revolved over the substrate. It may be thus applied in the field or the article may be supplied having the sealing material as a part thereof.

In a first embodiment, the article is used over a low voltage cable (including power and telecommunications cables), say less than 1 kV, or over an optical fibre cable, to provide environmental protection or electrical insulation to a splice in the cable or to act as a repair to a damaged portion of the cable jacket. The double-walled tube preferably comprises an insulating material of resistivity greater than $10^{10}$ ohm.cm especially greater than $10^{12}$ ohm.cm, which preferably has an ultimate elongation of at least 150%, more preferably at least 200%, most preferably at least 500%, especially at least 900%. The material preferably has a dielectric constant of from 2 to 6. Water absorption into the material should be low, preferably less than 2% especially less than 1% by weight. The material and the friction-reducing means should be stable at temperature at least up to 90° C. for long periods of time. Tension set should be low. The material preferably has U.V. stability, as may be achieved by the addition of carbon black, especially when the article is for outdoor use. The article may be used in conjunction with a sealing material as mentioned above. Other uses for such an article include bus bars, bushings, fuses, elbow connectors and various other electrical connections, electrical wires, pipes and pipe lines, including hose and irrigation pipes, particularly over weld areas and damaged sections, pylons of off-shore oil rigs, flag poles, and other articles of circular or other cross-sectional shapes. It may be desirable that the article can be removed easily. The article may be used with additional means such as a casing for example an outer tube or half-shells for further mechanical protection. Preferably, the article itself or the article with the additional means will pass an impact test substantially undamaged that consists in dropping vertically onto the article a 5 cm diameter steel ball from a height of 40 cms, preferably 60 cms, more preferably 90 cms. Where the substrate is large relative to the article it may be desirable to use means to aid the initial revolving action as the article is first expanded over the end of the substrate. Such means may include a funnel or other generally conical or frusto-conical object which may be placed at the end of the substrate over which the article can gradually ride. Revolving action may also be aided by ears or lugs affixed to the outer wall.

Where a cable comprises more than one conductor, for example the three conductors of a three-phase power supply, more than one double-walled tube may be used. In the case of the three-phase supply, a double-walled tube could be installed around each of the three cores, and optionally a further, larger, double-walled tube could be installed around the three covered cores.

In a second embodiment, the article may be used over a high voltage cable (splice or termination) or other conductor, generally greater than 1 kV, especially greater than 5 kV, often greater than 11 kV. Hence the article may provide, or be used in conjunction with, one or more other materials that provide, at least one or more of the following a stress-grading layer adjacent the conductor and the cable shield, and intermediate insulating layer, and an outer conductive layer providing shield continuity. A material suitable for providing stress grading preferably has a specific impedance of $10^7$ to $10^{10}$ ohm cm, especially $5 \times 10^8$ to $5 \times 10^9$ ohm cm at 60 Hz and a D.C. resistance of $10^{10}$ to $10^{11}$ ohm cm. A material suitable as a conductive layer in such applications preferably has a resistivity of less than $10^4$, especially less than 100 ohm cm. Each such material preferably, together with friction-reducing or separating means within its double wall as appropriate, preferably has an electrical strength of at least 100kV, especially at least 130kV per cm. Where two or more of these layers are provided by the article itself (the separation or friction-reducing means, particularly if it cures, may provide a layer) it will in general be necessary to cut the outer wall and roll it back down onto the substrate unless the inner and outer walls have the different electrical properties required. Preferred electrical properties were given above. We prefer that the inner layer comprise a void-filling stress-grading sealing material, and that a first insulation article be revolved over that material, and a second conductive article generally longer than the first be revolved over the first. The second article may in this way provide shield continuity across a splice. Alternatively, or additionally, a separate conductor, for example in wire or braid form, may provide shield continuity. A high voltage termination may also be constructed using one or more articles of the invention to provide one or both of a non-tracking layer and a stress-grading layer. The non-tracking layer should have suitable performance under the liquid-contaminant, inclined plane test, ASTM D2303. The material is desirably non-tracking and erosion resistant. Silicone materials and EPDM rubbers are preferred.

In a third embodiment cable protection, such as splice covering, cable jacket repair and termination, is provided in a dangerous or rough environment such as a mine. Here the double-walled tube preferably comprises a flame-retarded, abrasion-resistance and split or tear resistant material. Tear resistance, as measured by ASTM D624, Die C is preferably at least 90 N per cm (40 lb. per linear inch) especially 150 N per cm. The tube is preferably used with a sealing material such as a gel or a mastic that does not require heat for installation. In order to prevent the article revolving due for example to the cable being dragged along the ground, it may be particularly preferred to cut at least the outer wall and roll it back down onto the substrate. If the cut is made near one end of the article, both walls may be cut through since only a small length of the article will be lost.

Fourthly, an end cap, particularly a cable end cap or pipe plug may be provided. In this case the double-walled tube may be used in conjunction with an object that is in itself essentially an end cap, the tube serving merely to hold it in place. Alternatively, the tube may hold a blocking means in abutting relationship with an end of the cable or pipe. The blocking means may be provided fixed to a part of the inner wall of the double-walled tube.

In a fifth embodiment environmental protection is provided over a telecommunications cable splice. Such cables may contain up to, say, 2400 pairs of conductors, and splices can be considerably larger in diameter than the cables themselves due to the large number of crimp or other connectors required. The double-walled tube may be installed with ease over such a transition and can accommodate the changes in size, which it must do if it is to extend from the intact cable jacket of one cable across the splice region to the intact cable jacket of the other cable. It may be desirable to use the double-walled tube in conjunction with a liner which may be positioned over the splice and over which the tube is revolved. The liner may serve to provide mechanical strength, for example axial pull strength across the splice and impact strength, and especially if it has a metal component it may act as a moisture vapour barrier. If the separation or friction-reducing means is able to cure to a substantially rigid form after installation of the tube, it may be preferred to dispense with the liner. A preferred design of liner is a sheet of material that may be rolled around the splice (optionally being secured in the rolled configuration by an adhesive tape) and having crowned ends, the tapered fingers of which being bendable inwards to provide tapered ends to the now rolled liner corresponding to the transitions from the larger splice bundle down to the smaller cables. Instead of being in sheet form the liner may comprise two or more generally rigid half-shells.

It is often desirable to provide an environmental seal around a branched cable splice, where the branching cable leaves the splice almost parallel or at a small angle to to another of the cables, i.e. in a generally Y formation. Such a splice may be sealed by installing some sort of cover around it, but a problem arises in sealing the crutch region between the branching cables. Examples include branched telecommunication cables splices, or low voltage power branch joints, for example for street lighting. A seal can be made using the present invention by revolving a double-walled tube to a position overlying the splice such that it spans the region to be sealed. Where three cables are spliced in a generally Y formation, it will be convenient to revolve the tube, previously positioned at a place remote from the splice, along the cables represented by the base of the Y until it overlies the splice, although it could be revolved along both of the others. In some embodiments, the crutch region may automatically become at least partially sealed by virtue of the inner wall of the tube becoming deformed inwardly to conform to the shape of the cables. This effect will be greater, the greater the filling volume within the double-walled tube and the consequential greater tension in the outer wall since the inner wall must be expanded in order to conform to the cables.

Alternatively, or in addition, a sealing material may be provided in the crutch region, preferably a sealing material that is sufficiently soft that it can be deformed by the double-walled tube as it is revolved into position. A dam, for example a sealing material of greater stiffness than the sealing material proper, may be provided to restrict its flow or its deformation. Preferred sealing materials comprise mastics, curable adhesives and gels as described above. The sealing material may initially have the form of a block such as a rod or bar of such a cross-section, for example having concave opposite sides, that it conforms in generally to the shape of the crutch region. It preferably however extends proud of the cables so that it can be deformed as the tube revolves over it. Where the sealing material is of low viscosity it may be temporarily held in a container, preferably of the shape described. It may be noted that the revolving action puts the sealing material under compression but does not tend to displace it longitudinally. The tube may therefore be advanced so that the sealing material is completely covered.

The branch-off technique disclosed above allow seals to be formed that may be preferred for temporary closures, aerial splice closures or for non-pressurized cables. However, for long term closures for pressurized cables a stronger seal may be preferred. Such a stronger seal could be formed by employing an adhesive, such as a curable adhesive instead of or in addition to a mastic or a gel. Such an adhesive could be used in the way suggested above. Alternatively, an adhesive, or other sealing material could be provided within the double wall, optionally serving also as the separation or friction-reducing means, and released for example by puncturing the inner wall allowing the sealing material to flow into the crutch region and form a seal.

Any of the above seals may be enhanced by the use of means which bring towards one another the inner and outer (or just the inner) walls between the branching cables. A branch-off clip, such as that disclosed in Great Britain No. 2,019,120 may be used. Where a three legged clip is used, the centre leg may comprise a sealing material as mentioned above.

In a further embodiment, the invention provides a mechanical, and preferably leak-proof, coupling between two elongate substrates such as pipes. Here the requirement is axial pull strength, and optionally fluid tightness, rather than environmental protection of the surface of the substrate although that too may be provided. We prefer that the double-walled tube be used in conjunction with a substrate of such size that its inner wall where installed is under a tensile strain of at least 0.02. The article can provide at least three significant advantages as a pipe joint. Firstly a leak-proof joint can be made that will retain significant pressure. Secondly, the joint may be made or broken very quickly, and without tools. The article is simply revolved along one pipe generally by hand, that pipe and the pipe to which it is to be joined are placed end to end, and the article revolved to a position where it bridges the ends. The seal may be reinforced, with sealing materials as described above, or with an H-seal or other mechanical seal. Where the substrates to be joined are easily compressed, a support may be provided either around their outer surfaces so that the double-walled tube engages them at a position a short distance from their ends, or it may be provided as an internal support. Such a support may comprise a rigid tube or half-shells or a braided tube may be provided because of its flexibility.

A third advantage of the article for use as a pipe coupler is that it can combine an excellent fluid tight seal with flexibility, particularly allowing slight bending between the substrates joined. Also, the joint can absorb vibrations in one substrate, preventing or reducing their transmission to the other. The article can serve to transmit rotational motion.

The article is particularly useful as a pipe joint for water hoses, particularly for larger scale irrigation as well as gas and oil pipes, etc. Where a highly flexible pipe is to be joined, a substantially rigid internal support may be used.

In a seventh embodiment the article may be used to deliver an object onto, or move an object along a substrate. In general, the object, will have an opening therein of smaller diameter than that of the substrate and be deformable, particularly elastically deformable, such that it has to be stretched in order to fit on the substrate. Use of the article as a delivery system will, however, be useful even where no deformation of the object is required or possible (for example in the case of a ceramic high voltage shed); the article may then act as a spacer or gasket between the object and the substrate.

Installation may be carried out as follows. An end of the article is positioned on an end of the substrate in the usual way, i.e. by a revolving action, and then at least a portion of the object is positioned on the article. A force is then applied to cause the article to revolve. The force may be applied between the outer wall of the article and the substrate, or directly between the object and the substrate. This force causes the article to revolve and the object to be carried onto the substrate. Initially, the article will be positioned between the substrate and the object, and in this configuration the object may be moved along the substrate by revolving action of the article a distance generally equal to the length of the article. In some embodiments, particularly where the object is flexible, it may be deposited directly onto the substrate by continuing the revolving action such that the object is turned outside-in. A sealing material may thus be applied to what is initially an exterior surface of the object to provide a seal between the object and the substrate. The article may be removed by continuing the revolving action further or by reversing it back across the now installed object.

Where the article is used to apply sheds to a high voltage termination, it may be desirable that the article have stress-grading properties and be left in place between the cable and the shed. In such an instance the lubrication system may be hardenable particularly if later removal of the shed is not envisaged.

The article may be used to deliver an object to a specific position along a substrate. Here it is generally necessary to do one of three things. Firstly one may revolve the article onto an end of the substrate a certain distance before the object is placed over the free end of the article. Secondly one may place the object a certain distance over the article (for example by collapsing the article) before the article is revolved along the substrate. Thirdly, one may choose the length of the article such that the revolving action may start with the object at its end. In order to carry out the first two techniques effectively, the article may be provided with markings on its surface that can be correlated to the distance from the end of the substrate to which the object will be delivered.

An object positioned on a substrate may be removed or re-positioned using the article by a similar technique. If removal is to be prevented, the article may be provided with means that prevents axial movement in one direction. For example it may be provided with interior protuberances, such as barbs, that limit axial motion. The object may thus be installed on the substrate from one end thereof, but prevented from being removed from that end by the article.

In an eighth embodiment an article comprising the double walled tube is part of a larger device, and in particular comprises an outlet for an enclosure through which a substrate may pass. For example, the enclosure may house a cable splice and may comprise a CATV (cable antenna television) splitter box or a optical fibre splice case having therein one or more optical fibre organizers. An outlet for such a housing may consist of the double-walled tube, fixed for example in a hole in a wall, or it may comprise a rigid tubular outlet to which the double-walled article is attached. A cable or other substrate may simply be pushed through the double-walled tube the desired distance (the maximum distance will depend on the length of the double-walled tube and the way in which it is affixed to the enclosure) and a connection made to another cable or whatever inside the enclosure. The double-walled article will thus form an environmental seal around the cable, isolating the interior of the enclosure from the outside.

A ninth embodiment comprises a duct seal. Whilst a duct seal of sorts is provided in the previous embodiment (between the cable and the hole in the wall of the enclosure through which it passes) it is only brought about by the movement of the cable into the enclosure, and that movement will in general be limited; a modification will be preferred if a duct seal is to be provided between a substrate and a duct that are fixed relative to each other. This can be achieved by an article comprising two (or more) mutually substantially concentric double-walled tubes. Relative sliding motion between a substrate and a first double-walled tube may be avoided by sliding motion between the two walls of that tube, and that of course was all that was needed when the article was simply to be installed over a substrate. In the case of a duct seal, however, sliding motion between the seal and the duct has to be considered in addition to sliding motion between the seal and the substrate. The second double-walled tube, positioned around the first, takes care of that. Thus a double revolving action can take place by providing an axial force between the duct and the substrate on the one hand, and the outer wall of the inner article and the inner wall of the outer article on the other hand. This axial force may be applied by pushing or pulling on a tube or one or more rods or cords or other means that engages the outer and inner walls referred to. As in other embodiments, a sealing material may be used in conjunction with the article to enhance sealing. Means may also be provided to prevent further revolving action once the double article has been properly positioned in the duct. Such means may be particularly desirable where a pressure difference across the seal is expected.

Harnessing is provided by a tenth embodiment of the invention. Bundles of wires may be held together by revolving over them one or more double-walled tubes. Harnesses of considerable length may be made in this way, since the problem of friction in sliding a long tube over a long substrate is avoided. The existence of branches in the harness does not provide a problem: separate double-walled tubes may be provided over the branches, and the main trunk between the branches can be covered by revolving a double-walled tube over both the trunk and branch until it passes the branch and then back again to the desired position. In addition to producing cable harnesses, the double-walled tube may be used over two or more other substrates to hold them together mechanically.

An eleventh embodiment provides a cable block. Here the separation or friction-reducing means contained within the double wall is released and delivered to a desired region, for example the core of a multi-conductor cable where it may then cure or otherwise harden. Thus a cable block may be formed by revolving the article along a cable to a region such as a splice where the cable jacket is absent. When in position the inner wall of the double-walled tube is punctured and the tension in the outer wall causes the previously trapped material to be displaced into the cable. If the rate of release of the material is sufficiently slow, the puncture may be made while the double-walled tube is to one side of its desired position, since in this case it is the more accessible outer wall that is to be punctured. The tube is then moved to the desired position. The article may of course be used to deliver its contents for purposes other than the formation of a cable block. Displacement of the material may occur automatically due to the tension in the outer wall, or it may be caused or aided manually, by tape wrapping or by inflation or other means. It may be noted that puncturing of the inner wall results in the article having what may be regarded as an inside-out configuration. As a result the wall of the article is not subjected to peel by an internal pressure, as may result from the article being installed over a splice in a pressurized cable. This feature may be more relevant when a cable block is not provided since the block itself should prevent pressure from acting on the article. The reason that the article is not in peel is that internal pressure acts through the puncture on the inside of the article, thus forcing the inner wall against the substrate. For this effect to be achieved the material of the article must have a certain strength, or inflation of the article at its ends must otherwise be prevented.

In a twelfth embodiment environmental protection, thermal insulation or leak repair is provided around a pipe or a pipe joint. Where thermal insulation is required, such as around a joint in a district heating pipe, it may be desirable that a thermal insulation such as a gas or a foam or foamable liquid is provided in the closed region.

As will be apparent, this invention is extremely versatile. Situations or details where the invention can be substituted for a prior art article or technique can be found in the following: U.S. Pat. Nos. 3,610,291 to Heslop, 3,950,604 to Penneck, 4,118,260 to Boettcher, 4,142,592 to Brusselmann, 4,194,082 to Campbell, 4,350,842 to Nolf, 4,400,579 to Nolf, 4,409,426 to Nolf, 4,426,413 to Fentress, 4,431,861 to Clabburn et al, 4,466,843 to Shimirak, 4,467,137 to Paget et al, 4,485,269 to Steinberg, 4,478,486 to Fentress, 4,498,732 to Fentress, 4,499,129 to Kridl, 4,511,611 to Moisson and 4,518,819 to Larsson et al, and Great Britain 2,110,479 to Link et al, and 2,125,637 to Clabburn et al.

This invention is further illustrated with reference to the accompanying drawings, in which:

FIG. 1a is a perspective view of a typical article of the invention;

FIG. 1b is a transverse cross-sectional view of the article;

FIG. 1c is an axial cross-sectional view of the article;

FIG. 2 illustrates a preferred method of forming the article;

FIG. 3a illustrates an initial revolving action;

FIG. 3b illustrates subsequent revolving action;

FIG. 3c illustrates the installed article;

FIG. 4 illustrates the use of a cone-shaped device to expand an article of the invention just prior to its installation over an elongate substrate;

FIG. 5 illustrates an axial cross-section of a low voltage cable joint enclosed by an article of the invention;

FIGS. 6a-d illustrate the use of an article of this invention as a protective cover over an end of an elongate substrate;

FIG. 7 illustrates the use of an article of this invention together with a sealing material to protect a cable breakout;

FIG. 8 illustrates a joint between high-voltage cables protected by a conductive and insulating article of this invention;

FIGS. 9a and 9b illustrate a dual conductive insulating walled article of this invention;

FIG. 10 shows an article of this invention further comprising sheds for application to a high voltage termination;

FIG. 11 illustrates the use of an article of this invention as a duct seal;

FIG. 12 illustrates the use of this invention for sealing a telecommunications cable splice;

FIG. 13 illustrates the use of the present invention for joining together two pipes;

FIG. 14 illustrates the double-walled tube as part of a larger device;

FIG. 15 illustrates the use of the articles of the invention in forming a cable harness; and FIGS. 16-19 show an article of this invention being used to install an object onto a substrate.

In each of the applications illustrated, a sealing material may be applied to the substrate and/or to the article and the article then revolved over the substrate. The figures illustrate the various articles and substrates, but in some instances a sealing material has been omitted for clarity A typical article is illustrated in FIGS. 1a, 1b and 1c which provide respectively perspective, transverse cross-sectional and longitudinal cross-sectional views. The article 1 comprises an outer wall 2 and an inner wall 3. The walls are joined to form a continuous, closed double-walled tubular structure. A friction-reducing means 4 is located within the double wall, separating the walls and allowing relative sliding motion between them.

The wall sections may comprise a plurality of layers of material formed for example by lamination or co-extrusion. For example, the inner and outer walls may each comprise an interior layer (i.e. a layer facing the closed area within the double-wall structure) of say butyl rubber which is an effective gas diffusion barrier, and an exterior layer of ethylene-propylene-diene terpolymer rubber which has excellent weathering properties.

A separation means 4 may be provided between the inner and outer walls Such separation means may be solid, liquid, or gaseous. Examples of gases include air, oxygen, carbon dioxide, nitrogen, acetylene, helium, etc. The gas is preferably under a gauge pressure such as from 0.07 to 1.4 Kg per square cm (1-20 p.s.i.g.), more preferably 0.07 to 0.7, most preferably 0.14 to 0.35 Kg per square cm. Furthermore, the gas may be selected for its chemical, physical or electrical properties etc., for example an insulating, electronegative gas such as sulphur hexafluoride may be selected for use in a high voltage environment. The gas may be formed in situ from solid and/or liquid components within the double-wall, or it may be introduced from outside through a valve etc. For example, carbon dioxide may be generated in situ from a mixture of acetic acid and sodium bicarbonate. These components may be initially separated by a barrier such as polyethylene film until the article is to be installed. Then breaking of the barrier permits the components to react and generate the gas within the double wall. Similarly, acetylene may be generated in situ from calcium carbide and water.

When the separation means comprises a gas, the tubular article should be capable of inward expansion when the pressure of the gas is increased.

An article of this invention, generally tubular in shape, can be made by a variety of methods. The manner in which it is made is generally not critical. A preferred method of manufacture is illustrated in FIG. 2. In this method, a tube 5 approximately double the desired length of the tubular article is formed by, for example, extrusion. The ends 6 and 7 of the tube 5 are folded over until they form an overlap region as illustrated. Solid, liquid or semi-solid friction reducing means can be added at this point. The ends 6 and 7 may be secured together, for example by means of an adhesive, forming the continuous wall of the double-wall structure. The adhesive used should form a sufficiently strong bond to keep the ends 6 and 7 together during installation and use of the article. The adhesive can be for example a hot melt adhesive, pressure sensitive adhesive, curable adhesive e.g. of the same elastomer as the walls, contact adhesive or the like. If a solid friction-reducing means such as poly-tetrafluoroethylene, (PTFE) is used, a layer of PTFE may be laminated or bonded to the outer surface of the initial tube 5 before the ends 6 and 7 are folded back. If a grease is used, it may be spread onto the outer surface tube 5 before ends 6 and 7 are folded back.

Another preferred method comprises extruding individual tubes, one of smaller diameter than the other, arranging the tubes in concentric relationship and then bonding the ends of the tubes together The friction reducing means, if solid, can be advantageously applied to the outer surface of the tube of smaller diameter. Gaseous or other separation means, and liquid and particulate or powdered friction reducing means can be inserted between the concentrically arranged tubes prior to sealing both ends thereof. The friction reducing means can also be added into the space between the walls by injecting the appropriate material through a relatively small opening in the wall and then sealing the opening. The walls can be provided with a one way valve, preferably one that is relatively flat, to facilitate injecting the friction reducing or separation means into the space between the closed, double-walls. This is particularly advantageous if a gaseous separation means is used.

The tubular article can be formed by any other method, for example molding, casting, or the like. The walls of the article can be formed by dip coating a solid cylindrical object comprising a material which on subsequent treatment, e.g. crushing, dissolving, melting or the like, forms the friction reducing means.

The walls may be joined together by any technique suitable for the particular material of which they are made. Such techniques include, for example, adhesive bonding, for example by hot-melt adhesives, fusion bonding, ultrasonic welding, vulcanizing, clamping, taping or the like. Joining of the walls may include the use of an additional segment of flexible material, if desired, for example to reinforce the join area, e.g. by use of a patch or strip of flexible material. Preferably the walls are directly joined together using a lap, butt, scarf joint or the like.

To apply the double-walled tubular article 1 to a substrate 8, an end 9 of the article is expanded to the outer diameter of the substrate and an end of the substrate is inserted into the expanded open end 9 of the article, as shown in FIGS. 3a and 3b. The end of the article can be expanded manually if the difference between the inner diameter of the article and the outer diameter of the substrate is not too great and/or if the flexible material of the article is easily stretched, that is has a relatively low durometer hardness. (Installation over a cylindrical substrate with a flat end surface may be found easier if the tube is first positioned assymetrically with respect to the substrate, i.e. such that an edge (rather than the flat end surface) thereof extends slightly within the inner wall of the tube. The revolving action is then started, initially to cause the tube to move across the flat end surface. This should result in the end of the substrate lying wholly within the tube. Revolving action now can be continued in the usual way.) The force on the article will generally be applied at line 10, i.e. close to the end 9 of the substrate. The article defined above would buckle if it were applied at position 11. From FIG. 3b it can be seen that the circumferential tension in the right hand end 9 of the outer wall 2 will be greater than in the left hand end which would cause the friction reducing means 4 to be driven away from where it is needed, were it not for some means to restrict such displacement. Where there is a significant difference in the dimensions of the article and the substrate, e.g. up to about 5× or even greater, the article can be expanded over, for example a cone-shaped mandrel, e.g. a funnel described further below. If desired, the article can be positioned and then stored on a mandrel or support of greater diameter than the article The pre-expanded article can then be applied to a substrate by applying an axial force to the outer wall of the article causing it to move from the mandrel to the substrate with the unique revolving action. In this embodiment a relatively small initial force may be all that is necessary as the expanded article tends to self-revolve onto the smaller substrate.

Continued axial force causes the tubular article to move axially along the substrate as shown in FIG. 3c until the desired position is reached. If the axial force is discontinued, the tubular article remains where it is positioned on the substrate. If axial force is again applied to the outer wall generally in either direction the article will move along the substrate. Thus, the article can be used to cover, for example a cable joint. Before the cables are joined, the tubular article is positioned over one of the cables and axially revolved away from the cable end. The cables are then joined and the tubular article is positioned over the joint by applying an opposite axial force relative to the outer wall.

FIG. 3c illustrates, partially in cross-section, article 1 when fully on an elongate substrate. Article 1 comprises outer wall 2, inner wall 3 and friction reducing means 4. In FIG. 3c the arrows indicate movement of the outer wall 2 while substrate 8 substantially prevents axial motion of inner wall 3. As a result outer wall 2 progressively revolves into contact with the surface of substrate 8 resulting in moving the article 1 in an axial direction from left to right in the drawing.

FIG. 4 illustrates the use of a device 12 to expand double-wall tubular article 1 as it is about to be applied to substrate 8. Article 1 has an initial internal diameter which is less than the outer diameter of the substrate 8 to which it is to be applied. Device 12, conical in shape, is used to expand article 1 so that its inner diameter is substantially equal to (optionally could be expanded to greater than) the outer diameter of substrate 8. Axial force on outer wall combined with frictional and compressive force between inner wall and device 12 causes the article 1 to revolve in the direction of the force and it progressively advances along the cone-shape of device 12 thereby expanding. Continued axial force in that direction will cause article 1 to revolve onto substrate 8 and along substrate 8 until that portion of the substrate to be covered or enclosed by article 1 is reached.

A sealant, or gel or an adhesive may be applied to either the substrate or the article and in that case it may be particularly desirable to clean the surface of the substrate first. This may be done using cleaning means such as an abrasive strip or a cleaning tissue containing a suitable solvent. Because of the revolving action of the article, the outer surface can be so coated and on installation that surface revolves down onto the outer surface of the substrate. As discussed in more detail below, the surface of the article can be coated with other materials, e.g. conductive paints, etc., stress grading materials, corrosion resistant materials, heat activatable adhesive, or the like. This overcomes a major disadvantage of many prior art articles which require coating the inner surface of a tubular article to be, e.g. heat recovered, over a substrate and bonded thereto by the inner layer of adhesive.

Another technique for preventing further movement of the article along the substrate is to make the wall section to be adjacent the substrate substantially thicker than the other wall section. Once the thick wall section has been brought into contact with the substrate due to the axial revolution of the article, the thickness of the wall tends to inhibit or prevent further axial motion. Yet another technique is to revolve the article axially into the desired position and then remove the friction reducing means from within the double-wall of the article. This causes inner and outer wall sections to come into contact which generally makes further axial movement of the article difficult. This is especially convenient when a separation means comprising a gas is used, when the wall sections are both elastomeric and the substrate has a larger diameter than the initial inner diameter of the tubular article. The gas can be readily removed by puncturing the continuous double-wall of the tubular article. The stretched elastomeric material of the inner and outer wall sections exerts an inward force between the inner and outer wall sections and between the walls and the substrate. The resulting frictional and compressive forces between the elastomeric walls and the substrate, makes removal of the tube by application of an axial force extremely difficult if not impossible.

Such an article may, if desired, be provided with a valve, preferably one which is relatively flush with the wall that carries it. The valve may be used to remove a gaseous separation means as above. Then if, at some later time, it is desired to remove the article from the substrate, a fluid may be introduced into the region between the walls through the valve, allowing the article to be moved along the substrate as desired. The fluid may be removed or introduced by use of a syringe.

Removal of a gas or liquid may occur through the walls of the tubular article permeable to that gas or liquid. For example, the walls may be made of fluid permeable silicone rubber or neoprene rubber, through which the liquid or gas may pass. To prevent premature loss, the gas or liquid may be packaged in the annular space in a burstable container such as a flexible bag made of aluminum. Alternatively, the entire article may be enclosed in a fluid impermeable container such as an aluminum bag, a metal can, or a pouch of the type used for liquid beverages. When the article is to be positioned on the substrates, it is removed from the container, and revolved into position The gas or liquid then passes through the permeable walls of the article restricting further revolving.

The article may be applied to a variety of substrates, the size of the article being selected to accommodate the desired substrate. Articles having elastomeric walls can accommodate substrates of different dimensions. Further, an article may be used to enclose an elongate substrate whose diameter varies along its length. For example, the article may be positioned over a relatively large diameter splice bundle and the adjacent relatively small diameter cables, forming a tight fit with all underlying regions of the substrate. The axial revolving motion of the article permits it to be applied over relatively sharp changes in substrate diameter as well as tapered or gradual changes in diameter. We suprisingly found that the article is able to ride up sharp changes in diameter, for example 90° transitions by collapsing concertina-like at its end and thus forming its own funnel as a series of steps up to the larger diameter. Substrates enclosed or covered by the article may be cylindrical but can be of any cross-sectional configuration.

FIG. 5 illustrates the use of the article to cover a low voltage (i.e. below about 1000 volts) cable joint. As illustrated, the outer layers 13 of insulation and protection of the cables 14 have been removed to expose bare conductors 15. These conductors are connected by connector 16. Sealing material 17 in the form of a tape is applied around each cable insulation 13. The sealing material may comprise an elastomer-based composition such as that disclosed in U.S. Pat. No. 4,497,926 to Toy or a sealant tape such as that disclosed in GB 2,123,026 or EP 174,165. Article 1 has been positioned over the joint. Article 1 may comprise for example a continuous double-walled structure of neoprene 1.5 mm (60 mil) thick with a silicone oil 4 within the double-wall, or an EPDM rubber of wall thickness about 90 mm and a friction-reducing means comprising propylene glycol and polyacrylamide. Article 1 provides insulation for the conductive elements as well as mechanical protection, and together with sealant sealing material 17 environmentally seals the joint.

Sealant tapes of this type permit the article of this invention to be readily removed when desired and re-installed reforming a seal between the article and the cable. Another method of retaining the article in the cable is to remove the friction-reducing means from between the double walls.

For some uses of the article of this invention, such as its use over an electrical cable joint, it can be important that moisture, including moisture vapor, be excluded from the joint area. It is known that moisture vapor can diffuse through polymeric articles. Moisture vapor transmission through the article of this invention can be prevented or at least minimized by placing a metal foil layer between the inner and outer wall sections. The foil can be laminated or applied by vapour deposition to one or both of the interior surfaces within the double-wall if desired. Another method of introducing a metal layer is to place a quantity of low melting metal alloy into the space within the double-walls. Just before installation, the article is heated, for example by immersion in hot water. This causes the low melting alloy to melt becoming a liquid which can function as a friction reducing means. The article is then installed over the joint and allowed to cool. The metal alloy will solidify forming a metal layer within the double-wall structure which can function as a moisture vapor transmission barrier.

FIGS. 6a-d show a double-walled article 1 used to enclose an end of an elongate substrate 8, such as a cable. The article may be positioned so that a portion thereof extends over the substrate and a remaining portion extends therefrom. The extending region may be clamped or otherwise closed to seal the opening therein. Another method of sealing the end of a substrate is first to place a piece of protective material over its end and then apply the article over the protective material and substrate end. The article then holds the protective material in place. An alternative is illustrated in FIGS. 6a and 6b where the article 1 is used to hold a truncated cone 18 or other end block against an end of a cable or other substrate 8. FIG. 6a shows the situation before installation, and FIG. 6b after. A sealing material 17, for example in the form of a tape, may be used to retain the article in the installed position and/or to enhance an environmental seal. The article may also be retained by removing its friction-reducing means. The end block 18, may be pre-installed on the article 1. For a typical application, article 1 has inner and outer walls comprising a rubber such as neoprene, preferably 0.1 to 0.2, especially about 0.17 cm (0.062 inches) thick and 2 to 20 cm especially about 8 cm long. The double wall preferably contains 1.0 to 10 especially about 5 gms of a thickened aqueous solution of a water soluble polyacrylamide. The internal diameter of the article will depend on the size of the substrate, but from 0.2-20 cms is a useful range. We prefer that the article be readily removable from the end of the substrate, in which case we prefer that any sealing material 17 does not form a permanent bond.

FIGS. 6c and 6d show a closure comprising a tubular cover 19 having a closed end and an open end. The closure also includes a double-walled article 1 which is attached, for example by an adhesive, to the interior of the cover 19, proximate to its open end 21, thereby preventing the article being revolved off the cover 19. Alternative attachment means include mechanical devices such as a screw, bolt or retaining ring, or heat welding, or solvent welding The closure is shown being used to protect an end of a threaded pipe 22 by way of example. The cover 19 with article 1 may also be used as a closure for a container such as an ammunition canister. Ammunition canisters need to be inspected frequently and the excellent moisture seal combined with ease of re-entry obtainable by the invention is a great advantage. An indication that such a seal has been tampered with may be provided by a coating for example of a lacquer that will crack on re-entry.

A further use for such closures is over solid substrates such as table legs to prevent their damaging a floor etc. or to prevent sliding.

In FIG. 7, cable 14 has been broken out into cores 23. To protect the cable from ingress of water, pollutants in the environment, dirt, etc., at the cable breakout, a profile 24 of sealant or other sealing material is positioned at the breakout. Profile 24 may be preformed with three holes to accommodate cores 23 which pass therethrough. An article 1 is positioned around the profile 24 and the adjacent area of cable 14. The inner diameter of the double wall tubular article is less than the outer diameter of the profile 24. The resulting compressive force maintains the profile, which may comprise a gel or other conformable sealing material, in intimate contact, or causes it to come into intimate contact, with each of the cores to produce a leak-proof enclosure around the breakout.

The article can be used in enclosing a high voltage joint or similar electrical equipment, such as joints or terminations of electrical power cables Typically an enclosure for a high voltage joint comprises a plurality of elements to provide the desired electrical and mechanical protection. As mentioned above, a popular method of enclosing a high voltage joint is to apply one or more heat-recoverable sleeves. To provide the electrical properties required for a high voltage joint several layers of material having different electrical properties are employed either as a composite sleeve or as individual sleeves. A heat recoverable enclosure for high voltage joints is disclosed in U.S. Pat. No. 4,383,131 to Clabburn. One or more of the layers of such a joint may comprise the double-walled article.

For example, the outer conductive, or shielding layer, may be applied in the form of the article, in the form of a separate layer delivered by the article, or as a separate layer held in place by the article. The conductivity may be a property of the materials of the walls and/or of the separation or friction-reducing means. A resistivity less than about $5 \times 10$ ohm cm will generally be desirable. The walls alternatively may comprise a conductive polymeric (preferably elastomeric) material. They may also comprise a metallic mesh, screen or braid, for example embedded in the walls or laminated thereto. Conductive material may be present in the friction reducing means, for example as a thin metal layer deposited on the interior surfaces of the double-wall. A low melting alloy may also be used when molten as a friction reducing means and may solidify to provide shielding and/or act as a moisture-vapour barrier.

FIG. 8 illustrates a joint between high voltage electric cables 14, enclosed in a conductive and an insulating article.

In FIG. 8 are shown two 5 kV electric cables 14 with their outer jackets removed to expose shields 25, insulation and conductors 15, joined by conducting crimp or other connector 16. A void filling sealing material 26, preferably one that is stress grading, e.g. a polyepihalohydrin-based composition such as that disclosed in U.S. Pat. No. 4,378,463 to Senior et al. is placed over the conductors and insulation. An insulating article, 27, is positioned across the joint. The separation or friction-reducing means between the double-wall of article 27 is a relatively void-free material having suitable dielectric properties to insulate the joint. On top of insulating article 27 a further, but conductive, article 28 has been installed. The conductive article is shown connected to the cable shields by means such as leads 29. Alternatively or in addition the article 28 may extend past an end of article 27, thereby directly contacting a cable shield. Additional stress grading material may be desirable around conductors of higher voltage than 5 kV. This may be provided, if desired by use of a stress grading article of this invention.

While a high voltage joint may be produced using a double-walled article for each of the stress grading, insulating and conductive layers, it is to be understood that any of these layers may be provided in a conventional manner. Thus any one of the layers, two of the layers or all three layers may comprise or may be applied using the double-walled article.

The insulating and conductive layers of the joint enclosure can be provided in a single article. In this case the inner and outer walls may be of different materials, one being insulating and the other being conductive. The walls may be positioned with respect to each other such that when the article is applied to the joint, the conductive wall is outermost. Each wall may be a dual wall with an exterior insulating layer and an interior conductive layer. Application of such an article over a joint may require the additional step of creating a radial split in the outer wall as installed. This can be done, for example, by radially cutting through the outer wall, by removing a patch joining wall sections together, by dissolving the bond between the ends of the wall sections, etc. The resulting two wall ends are then slid along the inner wall and onto the substrate. The result is a single wall, having an interior insulating layer and an exterior conductive layer installed over the joint. This is illustrated in FIGS. 9a and 9b. In FIG. 9a, tubular article 1 has inner and outer walls each comprising an exterior insulating layer 30 and an interior conductive layer 31. The outer wall is radially slit through both layers and the resulting free ends are then slid as indicated by the arrows, aided preferably by any friction-reducing means that remains. The slit may alternatively be made towards one end of the article in which case it may penetrate both the inner and outer walls. In general, shear (as described) or peel between the two walls may occur in the absence of the revolving action to cause each wall to lie adjacent to the substrate.

A stress grading material, provided by the double-walled tube or otherwise, preferably comprises a material having specific impedance at 60 Hertz of about $10^7$ to about $10^{10}$ ohm-cm. Typical stress grading materials include polymeric materials, preferably an inherently stress grading material such as polyepihalohydrin and epihalohydrin copolymers or a polymeric, in particular an elastomeric, material having dispersed therein conductive particles such as carbon black, silicon carbide, iron oxide, metal or mixtures thereof.

As described above for the outer conductive layer, the stress grading layer may be provided as a composite structure with the insulating layer. In this case, the stress grading layer may comprise the inner wall of the article (when installed) with the outer wall being insulating. A dual wall structure can also be used with the exterior layer being stress grading and the interior layer being insulating. In this embodiment, the outer wall is radially slit and the free ends (or end as appropriate) are slid along the article and into contact with the substrate. The stress grading layer will then be immediately adjacent the substrate with the insulating layer surrounding it. An outer conductive article can then be applied. The conductive article can be a conductive article in accordance with this invention, a conventional dimensionally recoverable article, tape, paint, metallic mesh or braid, or the like.

An article of this invention combining stress grading, insulating and conductive layers can be provided if desired. In this case a three layered wall is provided having an exterior stress grading layer around the entire article, an intermediate insulating layer, and an interior conductive layer. The article is installed over the joint and the outer triple wall section is radially slit and the free ends (or the end as appropriate) slid down onto the cable. This results in a sleeve over the joint comprising an innermost stress grading layer, an intermediate insulating layer and an outer conductive layer.

As will be readily apparent to one skilled in the art, the materials of the walls and friction-reducing means can be varied to provide the combination of electrical, mechanical, physical and chemical properties desired for a particular use. The above description merely illustrates some of the types of selections that can be made.

An additional example of the myriad of variations possible in construction and using the article of this invention is the use of the article to enclose a high voltage termination. High voltage terminations generally are not shielded as are high voltage joints. They are however provided with sheds which increase the length of the outer surface of the termination thus improving its resistance to flashover or electrical discharge.

At higher voltages, e.g. above about 5 kV, a stress grading layer is generally provided over the cable insulation and bridging the cable shield As with high voltage joint enclosures as discussed above, the stress grading layer may be provided by use of a stress grading material in the walls or as the friction reducing means. The insulating material should be relatively void free and a non-ionizing material should be used for the friction-reducing and any separation means.

In enclosing a termination of this invention the stress grading layer, if present, is first positioned over the cable conductor and the lug or other device to which it is terminated. The stress grading layer may be provided by this invention. The insulating layer is then applied, and that too may be provided by this invention.

Sheds may then, if desired, be applied by any technique. Individual sheds may be slid over the end of the terminating lug into position on the installed article. The sheds are preferably of an elastomeric material and have a center hole slightly smaller in diameter than the diameter of the installed article. The sheds may be an integral part of the article comprising a double-walled tube, as shown in FIG. 10. In FIG. 10 an article 1 of this invention has outwardly projecting sheds 32 toward one end thereof. As the article is applied to the termination the sheds are carried, along with the wall to which they are attached, to their desired position.

The sheds 32 may be of sufficiently flexible material that they do not restrict or at least do not prevent the revolving action of the article. The sheds may comprise, if desired, the same material as that of the wall sections of the article. This may be done for examply by providing radial bands of relatively stiff material interposed between segments of highly flexible material, and applying a force at each end of the article toward the middle to cause the walls to buckle, forming outwardly projecting sheds.

In enclosing a termination in accordance with this invention at least one of a stress grading layer, an insulation and a shed is applied utilizing a double-walled article.

FIG. 11 shows the provision of a duct seal 33 by means of the invention. What follows applies also to the provision of what is known in the cables accessories and other arts as a feedthrough; the articles have similar functions and they differ primarily in the greater length of a feedthrough. An annular space between a cable 14 or other supply line etc. and a bulkhead or duct etc. 34 is to be sealed to prevent the transfer through it of moisture or other contaminant or heat etc. An article 33 comprising two mutually substantially concentric double-walled tubes 35 and 36 is positioned around the cable 14. The two tubes are then caused to revolve as indicated by the arrows. This may be achieved by inserting into the right hand side of article 1 as drawn (or withdrawing from the left hand side) some means 37 that engages the outer wall 38 of the tube 35 and the inner wall 39 of tube 36. It can be seen that the article 33 can advance to the left as drawn without shear between either it and the cable 14 or between it and the bulkhead 34. The means 37 may comprise a cylinder or a frame or one or more elongate devices such as rods or cords etc. Means 37 may be left in place when the article 1 has reached its desired position within the duct. Alternatively, means 37, particularly if it comprises rods or cords etc., may be removed, for example by pulling on means 37 whilst holding article 1 against further revolving action. Where a pressure difference across the bulkhead is expected, means may be provided to prevent the revolving action once the article has been properly positioned. Such means may include positioning of a block on at least one side of the installed article 1, such as a hose clamp 40. Further revolving action may also be prevented by the friction-reducing means or a separation means 4 solidifying after installation. Yet another possibility is to puncture one of the double-walled tubes (or otherwise remove friction-reducing means). This will prevent any revolving action since both are required due to the presence of the bulkhead as well as the cable. The double-walled tube that remains intact may contain a compressed gas (or be inflated) and therefore able to expand to compensate for the contraction of the punctured tube.

A telecommunications splice case 41 is shown in FIG. 12, formed using the invention. Here a branch joint is shown between three cables 14. The splice bundle 42 joining the cables can be seen to be of larger diameter than that of the cables 14. In order mechanically to protect the splice bundle 42, and optionally to provide a moisture vapour barrier, a liner 43 may be provided. The liner may for example comprise half-shells or may comprise a roll of material that is wrapped around the splice bundle 42. In either case, the liner may have crowned ends, the fingers of which may be bent inwards to produce the tapered ends 44. A double-walled tube 1 has been revolved into the position shown where it overlies the splice bundle and bridges the ends of the intact cable jackets, thereby forming an environmental seal around the otherwise exposed conductors, or optical fibres of the cable. A sealing material, for example a strip comprising a pressure-sensitive or curable adhesive, a gel or a mastic, may be provided around the cables 14, and is shown cross-hatched. Where a branch splice, as shown, is to be sealed, a sealing material may be provided in the crutch region between the branching cables. Such sealing material is shown as stippling 45.

FIG. 13 shows the use of the invention in joining together mechanically two elongate substrates, such as fluid supply lines, for example pipes 22. A fluid proof seal can be obtained that allows some relative movement between the substrates, allowing vibrations to be absorbed, or allowing for some misalignment between the substrates. Sealing may be improved if desired by the provision of means such as the H-seal illustrated at 46. Other solid or hollow substrates, for example scaffolding poles, may be held together end-to-end.

In FIG. 14, a double-walled article 1 is used as part of a larger device, for example as an outlet 47 of a CATV splitter box 48. The splitter box contains electrical contacts (not shown) for connection to the inner and outer conductors of a co-axial cable 49. At the right hand side of the drawing a double-walled article 1 is shown in position, for example mechanically fixed or bonded to an outlet of the splitter box 48. The cable 49 is simply pushed home, which causes the article 1 to revolve allowing the cable 49 to engage the electrical contacts within the box. The article 1 makes an environmental seal but may allow the cable easily to be withdrawn. At the left hand side of splitter box 48, a cable 49 is shown inserted into an outlet. In this case, an article 1 is prepositioned over the cable 49 so that it can be revolved into a position, where it will make a seal to the outside of the outlet 47. Where the box 48 extends further above and below its outlet 47 as drawn, the article may be provided with a circumferential flange (for example having the shape of a high voltage shed) or other means which will engage a surface of the box 48 and help to seal or to hold the article in place. We have suprisingly found that the article 1 is able to ride up sharp transitions, such as that from the cable to the outlet, without difficulty. It does this by collapsing concertina-like at its end, thus forming its own step up which it can ride.

FIG. 15 shows the invention used to hold elongate substrates together mechanically. In this case a cable harness 50 is made by holding together its component conductors 51. The side branches 52 may be covered by installing double-walled articles 1 over their ends as indicated by the arrows. The regions 53 between the branches may be covered by revolving an article 1 over a branch as indicated at 54 and then back again. The invention may also be used to hold together other substrates for example ropes, pipes, scaffolding poles or cables, even of widely differing diameters.

FIGS. 16 to 19 show the use of the invention for delivery of an object onto a substrate. A double-walled tube 1 is used.

In FIGS. 16a to 16d, an elastomeric tube 55 is being delivered on to a cable for the purpose of covering a splice therein or repair of a jacket thereof, etc.

In FIG. 16a a tube 55 is positioned over one end of article 1, optionally by folding inwards, or otherwise collapsing that end 56 of the article as shown. The other end 57 of the article 1 is revolved onto the substrate. An axial force is applied as shown by the arrow in FIG. 16b to cause further revolving action of the article 1, bringing the tube 55 onto the substrate. Tube 55 may comprise an elastomeric material and may initially have an inside diameter smaller than the diameter of the substrate. In this case, the revolving action just described will cause the tube 55 to be radially expanded. A sealing material may provide an improved environmental seal between the tube 55 and the article 1 and/or between the article 1 and the substrate. Such a sealing material may have been previously applied to any of the surfaces involved, for example as a tape applied around the substrate.

The situation depicted in FIG. 16b may represent the installed product, the tube 55 reinforcing a seal provided by the article 1.

The revolving action may however be continued as shown in FIGS. 16c and 16d. Here the tube 55 is carried by the outer wall of the article 1 until it reaches its end and is then turned inside-out. It is shown half inside-out in FIG. 16c. Further revolving action results in the article 1 overlying the tube 55, as shown in FIG. 16d. Again, this situation may represent the installed product, or alternatively, the article 1 could be removed by yet more revolving action to leave the tube 55 alone on the substrate.

The present invention also allows an object 55 to be moved from one position to another on a substrate, or to be removed from a substrate, simply be reversal of the above procedure. This is true even if the article had to be radially expanded to apply it. Heat-recovered articles, by contrast, are often damaged by attempts to remove them, and in any case they cannot simply be reused.

FIGS. 17a to 17d show the use of the invention in delivering high-voltage sheds 32 onto a cable 14. The technique used is analagous to that explained above in connection with the elastomeric tube 55.

The shed 32 is preferably of an elastomeric material and has a center hole slightly smaller in diameter than the diameter of the cable 14. The shed comprises a central, generally axially oriented, tubular base and a radially extending flange. Application of an axial force to the article 1 in the direction shown by arrow 58 carries the shed 32 onto the cable 14. As shown in FIGS. 17b and 17c, the axially extending base is carried by the article 1 into contact with the cable 14, and is inverted so that it is on the opposite side of the radially extending flange. The final assembly can be left as shown in FIG. 17b with the shed on the article, or the shed can be left deposited directly on the cable by removing the article 1 in the direction shown by the arrow in FIG. 17c. Generally the concave surface of the shed should face vertically upwards.

FIGS. 18a and 18b, shown in cross-section delivery of a shed 32 having a plurality of radially extending flanges 59 onto an electrical cable 14. FIGS. 18a and 18b also demonstrate how an article such as a shed 32 can be placed on a substrate such as a cable 14 at a preselected position. The preselected position is identified by a dashed line 60 in FIGS. 18a and 18b. The shed 32 is placed on the exterior of the article 1 and the article 1 is placed over the exterior of the cable 14. The relative positions between the shed 32, article 1 and cable 14 are chosen so that the distance between the forward end of the shed 32 and the forward end of the article 1, represented by distance X in FIG. 18a, is equal to the distance between the forward end of the article 1 and the position 60, represented by distance Y in FIG. 18a. Thus when distance X equals distance Y, the shed is carried onto the cable to position 60, at which point the shed reaches the end of the article 1.

FIGS. 19a to 19d demonstrate the use of the present invention for placing a porcelain or glass housing 61 or other non-expandable object over a terminated cable or other substrate 14. Outdoor terminations frequently use an outer insulating housing 61 made from porcelain or glass. The housing 61 normally has an internal tubular opening and has radially extending external flanges 59 for shedding moisture The space between the housing 61 and the cable 14 is preferably filled, especially with a non-ionizing material.

In FIG. 19a, the cable 14 has an outer conductive layer 25, an insulating layer 13 below the conductive layer, and an internal electrical conductor 15 to which is attached lug 62. An article 1 is shown in FIG. 19b placed over the lug 62 and the porcelain housing 61 is placed over the other end of the article 1. An axial force is applied to the article 1 in a direction shown by the arrows, so that the porcelain housing 61 is carried onto the cable 14. The inside diameter of the housing 61, is larger than the outer diameter of the insulating layer 13 of the cable 14. In the assembly shown in FIG. 19c, the article 1 is directly on the cable 14, with its forward end extending over the conductive layer 25, and the porcelain insulating housing 61 is on top of the article 1. The article 1 fills in the space between the insulating ceramic housing 61 and the cable 14, and a large filling volume within the double wall may be desirable here. The article 1 may also provide stress grading at the terminated end of the cable 14. Stress grading may be required in higher voltage cables due to the removal of the conductive layer 25. As discussed above, the article 1 can be made stress grading by incorporating conductive material into the material of its walls or within the double wall as a friction-reducing or separating means, or by applying to an exterior surface a stress-grading sealing material.

A second article 63 can be used as a gasket to seal together the cable 14, the insulating housing 61, and the first article 1. The second article 63 may also lock the housing and the first article 1 in place. This can be effected by preplacing the second article 63 on the cable 14 before the insulating housing is carried onto it. The installed configuration is shown in FIG. 19d.

Although generally the length of the object 61 to be placed on a substrate 14 is no more than twice the length of the article 1, the article can be longer than this. For example, an article 1 may have wrapped longitudinally around it an elongated tubular sleeve. The sleeve may be pictured attached at one end to an "end" of the article. The sleeve is then turned inside-out around the outside of the article (or outside-in to lie within the centre of the article). Such inversions may be repeated more than once. When the assembly of the article and the sleeve is revolved in one direction onto a substrate, the sleeve is continually placed on the substrate with the exposed end of the sleeve being layed on the substrate first. Thus a single article may be used to lay a long length of insulating tubing or other object onto a long substrate such as an electrical cable in a fast and easy operation. If the article is revolved in the opposite direction, the sleeve remains wrapped around the article, and the two together move along the substrate without the sleeve unwrapping.

A plurality of objects may be placed on a substrate adjacent, overlapping, or one on top of another, with one or more articles. Moreover, the object need not be tubular. For example the object may have an opening that is at least partially slot-shaped. In a further alternative, the material of the object adjacent its opening may be plastically deformable or it may be being formed by sponge rubber or the like, while the remainder of the object may be made of a rigid material such as a rigid polymeric material.

Further, the circumference of an opening of the object may be larger than the outer circumference of the substrate. For example, the opening of the object may be oval in cross-section with a minor axis shorter than the diameter of the substrate so that expansion of the article along its minor axis occurs as it is carried onto the substrate by the application.

Also, rather than the object comprising a deformable material, it may have arms or other parts adjacent or defining an opening therein that can be moved for example cantilevered so that they spread apart as the object is carried onto the substrate.

In conclusion it is stated that the invention provides any double-walled structure, method of covering a substrate such as a cable or a pipe for environmental, mechanical, chemical, or electrical reasons, lubrication system, covered substrate and kit including a double-walled structure, having any one of the features disclosed herein. For example, any one or more of the double-walled configurations, wall materials, dimensions, physical, electrical or chemical properties, friction-reducing means, sealing materials, method of use or of manufacture, and fields of use may be selected.

The invention specifically provides an article comprising a double-walled tube that can be continuously revolved along an elongate member by relative sliding motion between the two walls of the double wall, substantially without relative sliding motion between a wall adjacent the member and the member, the double wall:

(a) defining a closed region between its two walls;
(b) having between its two walls a friction-reducing means comprising a solid or a liquid; and
(c) comprising an elastomeric material;

such that if said liquid is non-setting, the volume of the closed region is such that when the article surrounds a substrate of a size such that its wall adjacent the substrate is under a positive tensile strain the average separation between its walls is less than 10 times its average wall thickness; and the tube being of such a configuration that it will buckle rather than revolve if subjected to an axial compressive force applied between an outer wall at one extreme end and an inner wall at an opposite extreme end.

The invention also provides a method of covering a supply line, which comprises revolving onto the supply line an article having a double wall and being capable of continuously revolving along an elongate member by relative sliding motion between the two walls of the double wall substantially without relative sliding motion between a wall adjacent the member and the member.

The invention also provides a method of environmentally sealing a substrate, which comprises: forcing a sealing material against the substrate by revolving over the substrate an article comprising a double-walled tube such that tension within a wall of the tube acts on the sealing material; said double-walled tube being capable of continuously revolving along an elongate member by relative sliding motion between the two walls of the double wall substantially without relative sliding motion between a wall adjacent one member and the member The invention also provides an article comprising: a double wall; and a friction-reducing means between the two walls of the double wall and comprising a non-newtonian liquid having a viscosity at a shear rate of 1 reciprocal second that is greater than 5 times the viscosity at a shear rate of 100 reciprocal seconds; the article being capable of being applied to a substrate by relative sliding motion between the two walls substantially without relative sliding motion between a wall adjacent the substrate and the substrate.

We claim:

1. A double wall tubular article comprising: a double wall defining a closed region between its two walls; and a friction reducing means between the two wall of the double wall and comprising a silicone oil, a semi-solid material or a particulate solid; the article being capable of being applied to a substrate by relative sliding motion between the two walls substantially without relative sliding motion between a wall of the article adjacent the substrate and the substrate; wherein the volume of the closed region is such that when the article surrounds a substrate of a size such that its wall adjacent the substrate is under a positive tensile strain, the average separation between its walls is less that 10 times its average wall thickness.

2. An article according to claim 1, in which the friction-reducing means is capable of maintaining lubrication under a pressure gradient of 27 kPa per cm.

3. An article according to claim 1, in which the average separation between the two walls is less than 10 times the average wall thickness.

4. An article according to claim 1, in which the double wall comprises an elastomeric material.

5. An article according to claim 4, in which the elastomeric material has a second modulus at 100% elongation of less than 24.7 Kg per cm$^2$ (350 psi), and an elongation to break of at least 100%.

6. An article according to claim 4, suitable for providing electrical insulation, in which the elastomeric material has a resistivity of greater than $10^{10}$ ohm.cm.

7. An article according to claim 6, in which the elastomeric material is substantially non-tracking.

8. An article according to claim 6, suitable for providing electrical stress grading, in which the elastomeric material has a specific impedance of $10^7$ to $10^{10}$ ohm.cm at 60 Hz.

9. An article according to claim 6, suitable for providing a conductive layer in a high voltage cable termination or joint, in which the elastomeric material has a resistivity of less than $10^4$ ohm.cm.

10. An article according to claim 6, in which the elastomeric material has a tear resistance of at least 90N per cm (40 lb. per linear inch).

11. An article according to claim 1, having the form of a double-walled tube, the double wall defining a closed region between its two walls.

12. An article according to claim 1, in which the double wall together with the friction reducing means has an electrical strength of at least 50 kV per cm.

13. An article according to claim 1, in which the article is applied to the substrate over an end thereof by engaging one wall of the double wall and the substrate, and applying an axial compressive force between the substrate and the outer wall at a position less than 7 cm from said end of the substrate.

14. A method of covering a substrate, which comprises revolving onto the substrate a double wall tubular article comprising (a) a double wall defining a closed region between its two walls and (b) a friction-reducing means between the two walls of the double wall and comprising a silicone oil, a semi-solid material or a particulate solid; the article being capable of being applied to said substrate by relative sliding motion between the two walls substantially without relative sliding motion between a wall of the article adjacent the substrate and the substrate wherein the volume of the closed region is such that when the article surrounds a substrate of a size such that its wall adjacent the substrate is under a positive tensile strain, the average separation between its walls is less than 10 times its average wall thickness.

15. A method according to claim 14, in which the substrate comprises two pipes that are thereby joined by the article.

16. A method according to claim 14, in which the substrate comprises a cable splice or termination that is thereby environmentally or electrically protected by the article.

17. A method applying a hollow object around a substrate, which comprises interposing between the object and substrate a double wall tubular article comprising (a) a double wall defining a closed region between its two walls and (b) a friction-reducing means between the two walls of the double wall and comprising a silicone oil, a semi-solid material or a particulate solid; the article being capable of being applied to a substrate by relative sliding motion between the two walls substantially without relative sliding motion between a wall of the article adjacent the substrate and the substrate wherein the volume of the closed region is such that when the article surrounds a substrate of a size such that its wall adjacent the substrate is under a positive tensile strain, the average separation between its walls is less than 10 times its average wall thickness.

18. A method of forming a duct seal between a duct and a substrate that passes therethrough, which comprises revolving along the substrate to a position within the duct an article comprising a double-walled tube that can be continuously revolved along an elongate member by relative sliding motion between the two walls of the double wall, substantially without relative sliding motion between a wall adjacent the member and the member, the double wall tubular article comprising (a)

a double wall defining a closed region between its two walls and (b) a friction reducing means between the two walls of the double wall and comprising a silicone oil, a semi-solid material or a particulate solid; the article being capable of being applied to the substrate by relative motion between the two walls substantially without relative sliding motion between a wall of the article adjacent the substrate and the substrate wherein the volume of the closed region is such that when the article surrounds a substrate of a size such that is wall adjacent the substrate is under a positive tensile strain, the average separation between its walls is less the 10 times its average wall thickness.

19. A method of covering a supply line, which comprises revolving onto the supply line a double wall tubular article comprising (a) a double wall defining a closed region between its two walls and (b) a friction reducing means between the two walls of the double wall and comprising a silicone oil, a semi-solid material or a particulate solid; the article being capable of being applied to the supply line by relative sliding motion between the two walls substantially without relative sliding motion between a wall of the article adjacent the supply line and the supply line wherein the volume of the closed region is such that when the article surrounds a substrate of a size such that its wall adjacent the supply line is under a positive tensile strain, the average separation between its walls is less than 10 times its average wall thickness.

20. A method according to claim 19, in which environmental protection, electrical protection, and/or thermal insulation or conductivity is provided at least partly by said article.

21. A method according to claim 20, in which electrical insulation is provided around a conductor, said article comprising a material having a resistivity of greater than $10^{13}$ ohm cm.

22. A method according to claim 20, in which electrical stress-grading is provided around a high voltage conductor splice or termination, said article comprising a material having a specific impedance of $10^7$–$10^{10}$ ohm cm at 60 Hz.

23. A method according to claim 20, in which electrical shielding is provided around a conductor splice or termination, said article comprising a material having a resistivity of less than $10^4$ ohm cm.

24. A method according to claim 20, in which electrical protection is provided around a high voltage conductor splice or termination, said article comprising a material having an electrical strength of at least 50 kV per cm.

25. A method according to claim 19, in which environmental protection, electrical protection and/or thermal insulation or conductivity is provided at least partly by an object delivered to the supply line by said article.

26. A method according to claim 25, in which said object comprises a shed.

27. A method according to claim 25, in which environmental protection, electrical protection and/or thermal insulation or conductivity is supplemented by a sealing material.

28. A method according to claim 27, in which said revolving forces the sealing material against the supply line.

29. A method according to claim 19, in which the supply line comprises two pipes that are mechanically secured end to end by said article.

30. A method according to claim 19, in which said article comprises a material having a tear resistance of at least 90N per cm (40 lb. per linear inch).

31. A method according to claim 19, in which the article comprises a material that is substantially non-tracking.

32. A method according to claim 19, in which environmental protection is provided around a cable splice or termination, said article comprising a material having a maximum water absorption less that 2% by weight.

33. A method according to claim 19, in which environmental protection is provided around a telecommunications cable splice, said method additionally comprising positioning around said splice a liner over which the article is revolved.

34. A method according to claim 19, in which the supply line comprises a multi-core cable, said method additionally comprising forming a cable block by delivering a curable composition to the cable core.

35. A method according to claim 19, in which the double wall comprises one or more elastomeric materials and is of such a size relative to that of the supply line that said revolving involves stretching the material of the wall adjacent the supply line by an average of 10–150% based on its unstressed dimension.

36. A method according to claim 19, in which a cable is sealed to an outlet in a housing through which it enters the housing, said article being attached to the outlet, and said revolving being caused by inserting the cable into the outlet.

37. A method according to claim 19, which additionally comprises radially slitting the outer wall and then causing shear or peel between the two walls in the absence of revolving, such that each of said walls is caused to lie adjacent the supply line.

38. A method according to claim 19, in which at least one wall of said double-walls comprises at least two layers having different electrical properties.

39. A method according to claim 19, in which the article is revolved onto an end of the supply line by engaging one wall of the double wall and said end of the supply line, and applying an axial compressive force between the supply line and the other wall at a position less than 7 cm from said end of the supply line.

40. A method of environmentally sealing a substrate, which comprises: forcing a sealing material against the substrate by revolving over the substrate an article comprising a double walled tube such that tension within a wall of the tube acts on the sealing material; said double walled tube having a friction-reducing means between the two walls of the double wall and comprising a silicone oil, a semi-solid material or a particulate solid; the article being capable of continuously revolving along an elongate member by relative sliding motion between the two walls of the double wall substantially without relative sliding motion between a wall of the article adjacent the member and the member wherein the volume of the closed region is such that when the article surrounds a substrate of a size such that its wall adjacent the member is under a positive tensile strain, the average separation between its walls is less than 10 times its average wall thickness.

41. A method according to claim 40, in which the article is revolved over an end of the substrate by engaging an inner wall of the tube and said end of the substrate, and applying an axial compressive force between the substrate and an outer wall of the tube at a position less than 7 cm from said end of the substrate.

42. A method according to claim 40, in which said double wall comprises one or more elastomeric materials having a secant modulus at 100% elongation of less than 27.4 Kg per cm$^2$ (350 p.s.i.) and an elongation to break of at least 100%.

43. A method according to claim 40, in which the sealing material comprises a mastic, or a gel, or a curable or pressure sensitive adhesive.

44. A method according to claim 43, in which the sealing material comprises a gel having a cone penetration value of 100-350 (10$^{-1}$ MM).

45. A method according to claim 43, in which the sealing material comprises a gel having an ultimate elongation of at least 200%.

46. A method according to claim 40, in which the sealing material is applied to the substrate in the form of a tape.

47. A method according to claim 46, in which the tape comprises a perforate material impregnated with the sealing material.

48. A method according to claim 40, in which the sealing material comprises a non-silicone polymer having an olefinic unsaturated content of less than 10 mole per cent and having 0.1-3 cross-links per weight average molecules; a liquid dispersed in the polymer in an amount of 20-95% based on the weight of the liquid and the polymer; and optionally a filler dispersed in the liquid and/or polymer.

49. A method according to claim 40, in which the substrate comprises a high voltage conductor splice or termination and the sealing material has a specific impedance of 10$^7$-10$^{10}$ ohm cm at 60 Hz.

50. A method according to claim 40, in which the double-walled tube comprises a material having a resistivity of greater than 10$^{10}$ ohm cm.

51. A method according to claim 40, in which the substrate is of non-uniform or non-circular cross-section and said sealing material has a cone penetration of 10-350 (10$^{-1}$MM), said revolving causing the sealing material substantially to conform to the surface of the substrate.

52. A method according to claim 40, in which the substrate comprises a cable branch, the sealing material being caused substantially to conform to the crutch region between the branching cables.

* * * * *

UNITED STATES PATENT AND TRADEMARK OFFICE
CERTIFICATE OF CORRECTION

PATENT NO. : 5,070,597

INVENTOR(S) : Holt et al.

DATED : December 10, 1991

It is certified that error appears in the above-identified patent and that said Letters Patent is hereby corrected as shown below:

Cover Page, Title [54], after "Article" insert --and Method of Making--.

Cover Page, Related U.S. Application Data [63], lines 6 to 7, replace "which is a continuation-in-part of Ser. No. 757,212" by --all of which are continuations-in-part of Ser. No. 757,212--.

Cover Page, Cited References [56], Foreigh Patent Documents, lines 5 to 6, delete second occurence of "653664 3/1979 U.S.S.R.".

Column 1, line 12, replace "06.907,200" by --06/907,200--.

Column 7, line 44, after "3/2/1987" insert --, now abandoned--.

Column 11, line 4, replace "i set" by --is set--.

Column 11, line 9, replace "heat" by --head--.

UNITED STATES PATENT AND TRADEMARK OFFICE

CERTIFICATE OF CORRECTION

PATENT NO. : 5,070,597

INVENTOR(S) : Holt et al.

DATED : December 10, 1991

It is certified that error appears in the above-identified patent and that said Letters Patent is hereby corrected as shown below:

Column 11, line 19, replace "heat" by --head--.

Column 12, line 13, replace "solubizing" by --solubilizing--.

Column 15, line 32, replace "106" by --$10^6$--.

Column 16, lines 48 to 49, replace both occurences of "flame-retardents" by --flame retardant--.

Column 17, line 53, replace "following" by -following:--.

Column 17, line 54, replace the second occurence of "and" by --an--.

UNITED STATES PATENT AND TRADEMARK OFFICE

CERTIFICATE OF CORRECTION

PATENT NO. : 5,070,597

INVENTOR(S) : Holt et al.

DATED : December 10, 1991

It is certified that error appears in the above-identified patent and that said Letters Patent is hereby corrected as shown below:

Column 18, line 25, replace "abrasion-resistance" by --abrasion-resistant--.

Column 19, line 44, replace "generally" by --general--.

Column 19, line 55, replace "allow" by --allows--.

Column 24, line 28, replace "walls" by --walls.--.

Column 31, line 62, replace "shield" by --shield.--.

Column 32, line 23, replace "examply" by --example--.

Claim 1, line 3 (col. 37, line 38), replace "friction reducing" by --friction-reducing-- and replace "wall" by --walls--.

Claim 12, line 2 (col. 38, line 14), replace "friction reducing" by --friction-reducing--.

UNITED STATES PATENT AND TRADEMARK OFFICE

CERTIFICATE OF CORRECTION

PATENT NO. : 5,070,597

INVENTOR(S) : Holt et al.

DATED : December 10, 1991

It is certified that error appears in the above-identified patent and that said Letters Patent is hereby corrected as shown below:

Claim 18, line 11 (col. 39, line 2), replace "friction reducing" by --friction-reducing--.

Claim 18, line 15 (col. 39, line 6), before "motion" insert --sliding--.

Claim 37, line 4 (col. 40, line 34), before "revolving" insert --said--.

Claim 40, lines 4 and 6 (col. 40, lines 48 & 50), replace each occurence of "double walled" by --double-walled--.

Claim 43, line 3 (col. 41, line 8) replace "pressure sensitive" by --pressure-sensitive--.

Signed and Sealed this

Twenty-sixth Day of April, 1994

Attest:

BRUCE LEHMAN

Attesting Officer     Commissioner of Patents and Trademarks